United States Patent [19]

Young

[11] 4,111,494
[45] Sep. 5, 1978

[54] VEHICLE BRAKING SYSTEM INCLUDING VALVES FOR BRAKING MODULATION DURING CORNERING

[75] Inventor: Alastair John Young, Leamington Spa, England

[73] Assignee: Automotive Products Limited, Leamington Spa, England

[21] Appl. No.: 709,607

[22] Filed: Jul. 28, 1976

Related U.S. Application Data

[63] Continuation of Ser. No. 544,490, Jan. 27, 1975, abandoned.

[30] Foreign Application Priority Data

Jan. 28, 1974 [GB] United Kingdom ............... 3935/74

[51] Int. Cl.² .................. B60T 8/18; B60T 8/24; B60T 8/26
[52] U.S. Cl. .................. 303/6 C; 188/195; 303/22 R
[58] Field of Search ............... 303/6 C, 6 R, 22 R, 303/22 A, 24; 188/195, 16, 349, 354; 180/103, 100; 280/DIG. 1, 112 A, 6 R, 6.1

[56] References Cited

U.S. PATENT DOCUMENTS

| 3,059,976 | 10/1962 | Whelan | 303/22 A X |
| 3,101,220 | 8/1963 | Wettstein | 303/22 A |
| 3,129,035 | 4/1964 | Alfieri | 188/354 X |
| 3,475,059 | 10/1969 | Klein | 303/22 A |
| 3,848,932 | 11/1974 | Lewis | 303/22 R |

FOREIGN PATENT DOCUMENTS 957,878 5/1964 United Kingdom ............... 303/22 R

Primary Examiner—Trygve M. Blix
Assistant Examiner—Douglas C. Butler
Attorney, Agent, or Firm—Lawrence J. Winter

[57] ABSTRACT

A liquid pressure braking system for a vehicle has a master cylinder which is connected to the brake operating motor cylinder on each wheel of the vehicle through a respective pressure control valve. Each pressure control valve is operated by a plunger which is linked to the suspension of the respective wheel by a respective torsion bar. Each torsion bar exerts a biassing load on the respective plunger which varies with the load supported by the respective wheel and which acts upon that plunger to open that valve. The action of the biassing load on each plunger is opposed by the loading on that plunger due to liquid pressure in the respective motor cylinder. A compression spring acts on the plunger of each pressure control valve which controls liquid pressure fed to the motor cylinders that operate the front wheel brakes so that those two valves are held open for all straight ahead braking. Load transfer from the inboard wheels during cornering reduces the biassing load that acts upon the respective pressure control valve plunger so that the braking pressure that acts upon the inboard wheels is reduced. Each pressure control valve may be a pressure reducing valve as defined, or may be a valve which is re-opened after closure only if the applied biassing load is increased or master cylinder pressure is reduced. Various control mechanisms for controlling the pressure control valves that control liquid pressure fed to the front wheel brake operating motor cylinders are disclosed.

20 Claims, 18 Drawing Figures

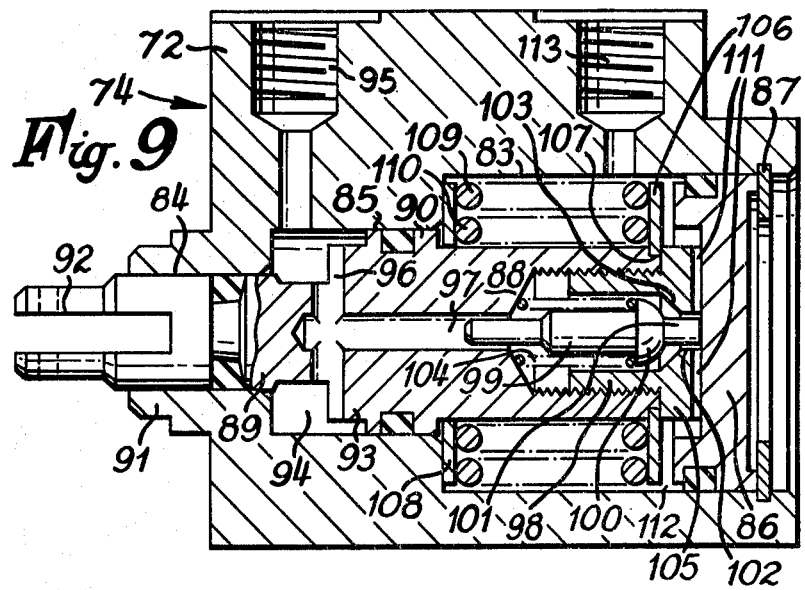
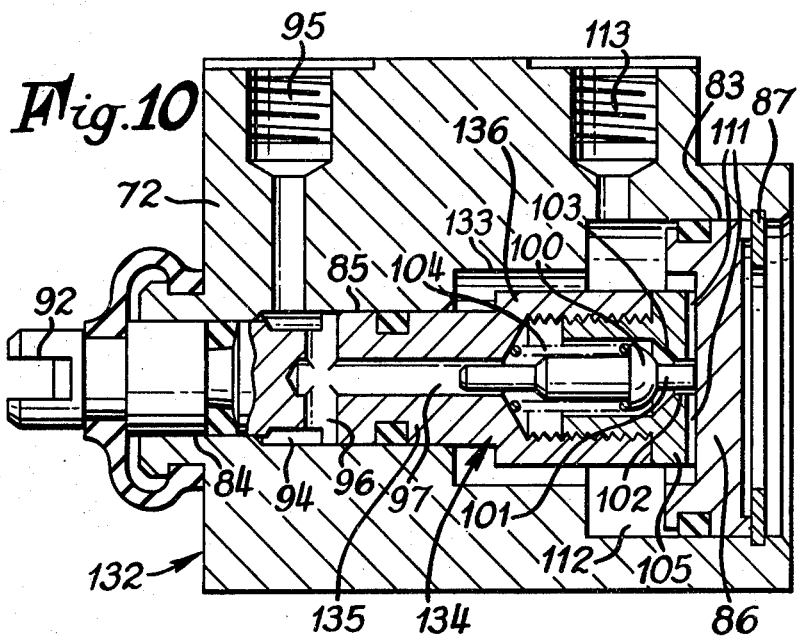

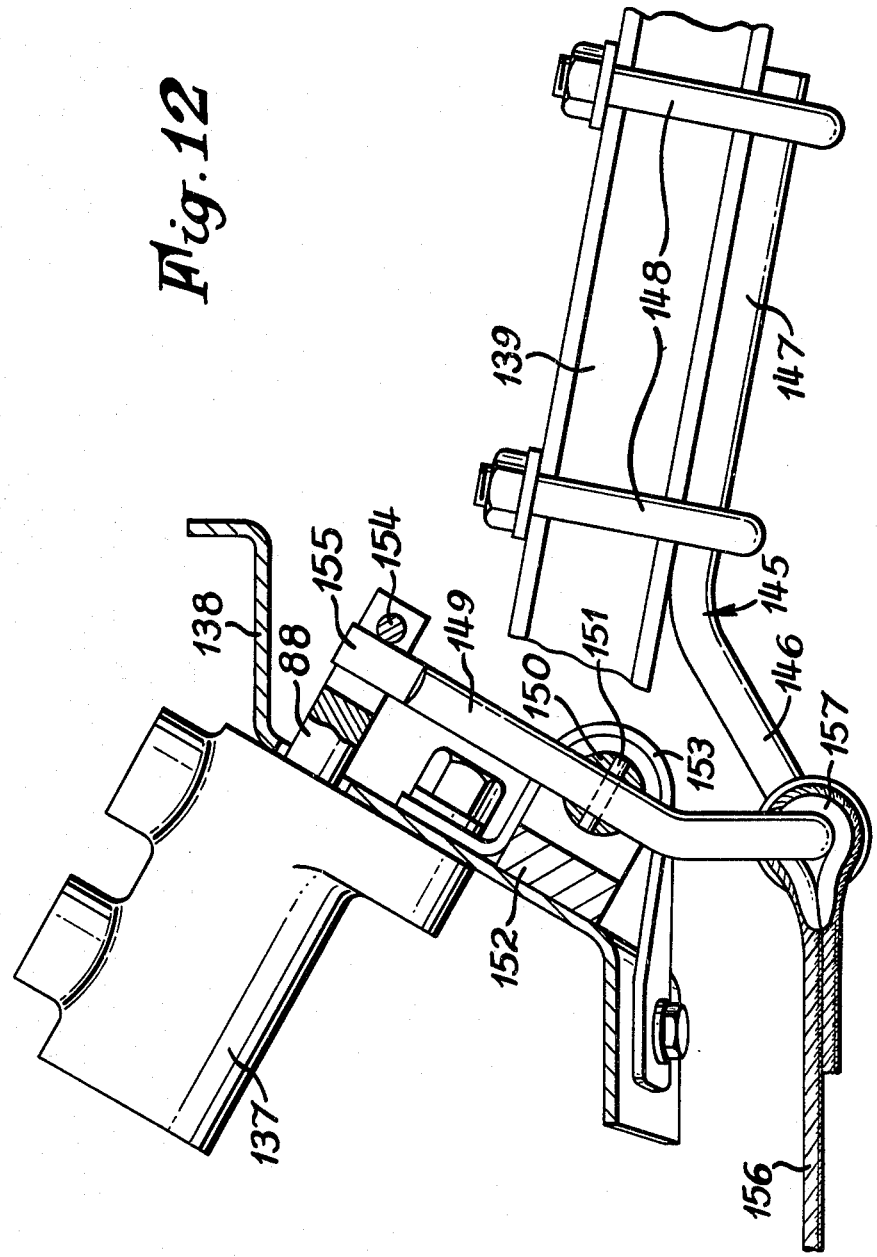

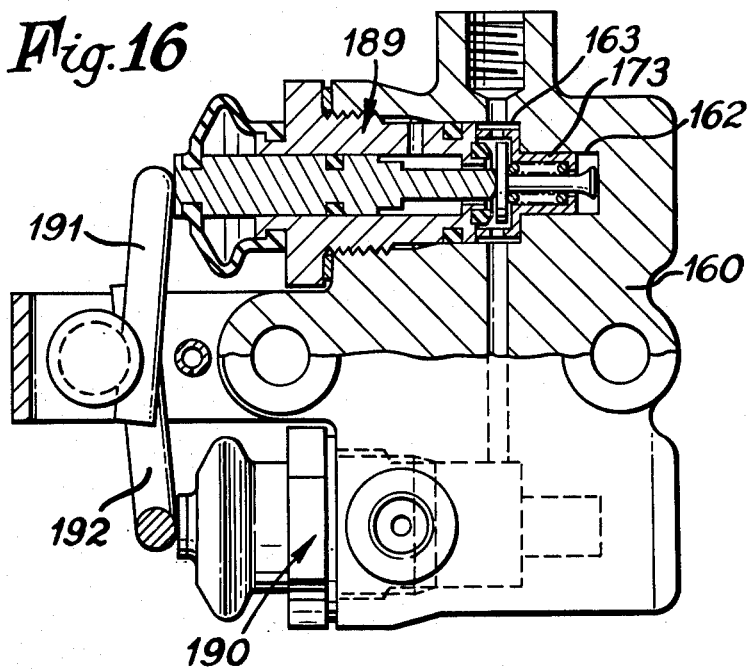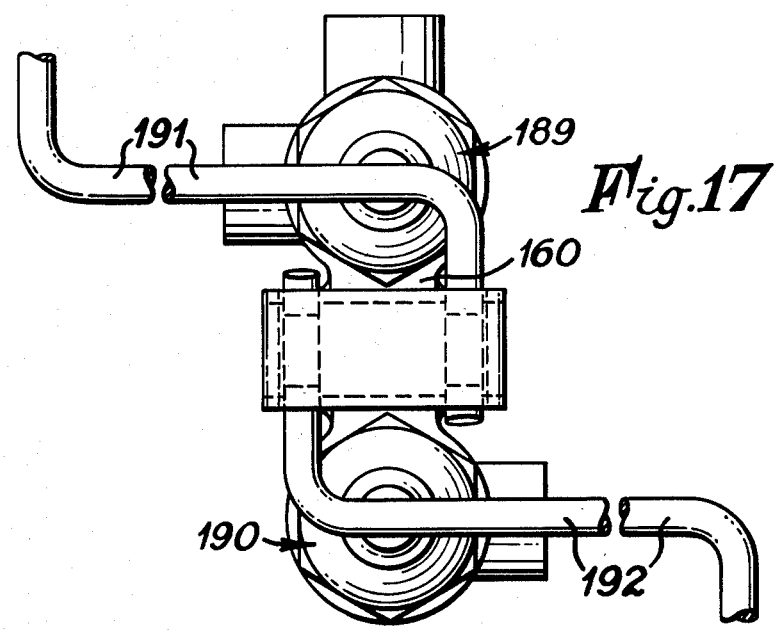

VEHICLE BRAKING SYSTEM INCLUDING VALVES FOR BRAKING MODULATION DURING CORNERING

This application is a continuation of application Ser. No. 544,490 filed Jan. 27, 1975 now abandoned.

This invention relates to fluid pressure braking systems for vehicles.

It is well known that one of the factors controlling the adhesion between the tyres of a vehicle and the road surface is the load carried by the vehicle wheels. Thus, under any road surface conditions, the brakes of a vehicle can be applied to a greater extent without causing skidding of the wheels when the vehicle is heavily loaded than when the vehicle is lightly loaded. Furthermore is is well known that the distribution of the total weight of the vehicle body amongst the wheels of the vehicle varies dynamically as the vehicle is being driven so that the proportion of the total weight of the vehicle supported by any one wheel of the vehicle is not likely to remain constant.

In order to cater for the transfer of weight from the rear wheels to the front wheels of a vehicle when the brakes of that vehicle are applied whilst the vehicle is moving forwards, it is now becoming fairly common practice to provide such a motor vehicle with a fluid pressure braking system which includes a valve device for controlling the pressure exerted to apply the brakes on the rear wheels of the vehicle so that, under a predetermined condition, that pressure is reduced in relation to the pressure at a source from which that pressure is derived, the predetermined condition being the pressure in the braking system at which the valve device becomes operative.

It is an object of this invention to provide a fluid pressure braking system for a motor vehicle in which the pressure exerted to apply a brake to a wheel of the vehicle is varied with dynamic changes in the load supported by that wheel as the vehicle is driven around a bend or corner.

Another object of this invention is to provide a fluid pressure braking system for a motor vehicle which can be operated to achieve greater vehicle deceleration for a given acceleration whilst the vehicle is being driven round a bend or corner than can be achieved if the vehicle is fitted with a conventional braking system which operates to exert substantially the same pressures to apply brakes to each pair of opposite wheels of the vehicle.

A further object of this invention is to minimise the incidence of a rear wheel of a vehicle locking before any other wheel of the vehicle.

Yet a further object of this invention is to provide a fluid pressure braking system for a vehicle which can be operated to apply brakes to wheels of the vehicle whilst the vehicle is being driven around a bend or corner without the steering characteristics of the vehicle being varied significantly.

A still further object of this invention is to provide a fluid pressure braking system for a vehicle which requires a greater effort by the driver to achieve a certain degree of braking whilst the vehicle is being driven around a corner than is required to achieve the same degree of braking when the vehicle is travelling in a straight line.

Broadly the invention provides a fluid pressure braking system for a vehicle which includes a first fluid pressure control device for controlling the pressure that is exerted to apply a brake to a first wheel which is on one side of the vehicle, a second fluid pressure control device for controlling the pressure that is exerted to apply a brake to a second wheel which is on the other side of the vehicle, and a control mechanism which modifies the performance of at least one of said fluid pressure control devices in response to load transfer to or from one of said wheels so that any pressure which is exerted to apply the brake to the other of said wheels is higher than any pressure which is exerted to apply the brake to said one wheel.

Preferably said first and second wheels are front wheels of the vehicle and each fluid pressure control device comprises a valve member and a cooperating valve seat. The control mechanism is operable to exert a biassing load which acts to separate each valve member and the respective valve seat so as to allow the transmission of fluid pressure from the source through the space between the valve member and the valve seat of each control device. Each fluid pressure control device is arranged so that the action of the biassing load exerted by the control mechanism is opposed by the action of fluid pressure which is exerted to apply the brake to the respective wheel so that the respective valve member seats when that fluid pressure reaches a level which is dependent upon the respective biasing load. The control mechanism or mechanisms are operable to change the biassing load that is exerted to separate the valve member and the valve seat of either fluid pressure control device in response to conditions which indicate that the load supported by the respective wheel is reduced and the brakes are applied. Hence any pressure which is exerted to apply the brake to the other of said first and second wheels is higher than any pressure which is exerted to apply the brake to the said respective wheel. Preferably the biassing load which acts to separate each valve member and the respective valve seat is sufficient to hold the valve member and the valve seat of each of said fluid pressure control devices separated if the control mechanism senses conditions which indicate that the two front wheels support substantially identical loads so that the pressure exerted to apply the brakes to both said front wheels is not varied from the pressure that is transmitted by the driver controlled source of fluid pressure.

In one embodiment of this invention, each fluid pressure control device is a pressure reducing valve which is arranged so that an increase in the fluid pressure that is transmitted by the driver controlled fluid pressure source after the valve member has seated causes that valve member to be unseated to permit a further increase in the fluid pressure that is transmitted from said source through the space between that valve member and the associated valve seat, the valve member being reseated by the increased fluid pressure downstream thereof before that downstream fluid pressure reaches the pressure that is transmitted by the driver controlled source of fluid pressure so that the pressure that acts to apply the brake to the respective wheel increases at a lower rate than does the pressure that is transmitted by the driver controlled source of fluid pressure after the valve member has seated initially, and including resilient means which act to separate the valve member and the valve seat and thereby to oppose the action of the biassing load exerted by the respective control mechanism.

In another embodiment of this invention, the control mechanism for the two fluid pressure control devices is responsive to relative movement between the vehicle body and each of two reference wheels which are on opposite sides of the vehicle and is operable to exert a force which causes the said change in the biasing load of the appropriate fluid pressure control device when the relative movement between the vehicle body and one of the references wheels differs from the relative movement between the vehicle body and the other reference wheel, the arrangement being such that no such force is exerted when the relative movement between the vehicle body and the two reference wheels in the same.

BRIEF DESCRIPTION OF THE DRAWING

Various other objects and advantages of the present invention will be readily apparent when considered in connection with the accompanying drawings forming a part thereof and in which:

FIG. 9 is a section on the line IX—IX of FIG. 6 of one of the valve devices of the assembly shown in FIGS. 6 to 8;

FIG. 10 is a view similar to FIG. 9 of one form of valve device for use in the liquid pressure braking system shown in FIG. 1 to control liquid pressure which acts to apply a brake to a rear wheel of the vehicle;

FIG. 12 is a partly sectional view of that part of the control mechanism shown in FIG. 11 as seen along arrow X in FIG. 11;

FIG. 13 is a side view of the assembly of a different pair of valve devices which contol liquid pressure which acts to apply brakes to the front wheels of the vehicle in another form of liquid pressure braking system and part of another form of control mechanism for those valve devices according to this invention, one of the valve devices being shown in section;

FIG. 14 is an end elevation of the assembly shown in FIG. 13;

FIG. 16 is a view similar to FIG. 13 of the assembly of the pair of valve devices which control liquid pressure which acts to apply brakes to the rear wheels of the vehicle in the liquid pressure braking system which incorporates the assembly shown in FIGS. 14 to 16, and of the associated control mechanism;

FIG. 17 is an end elevation of the assembly shown in FIG. 16; and

Figure 1:
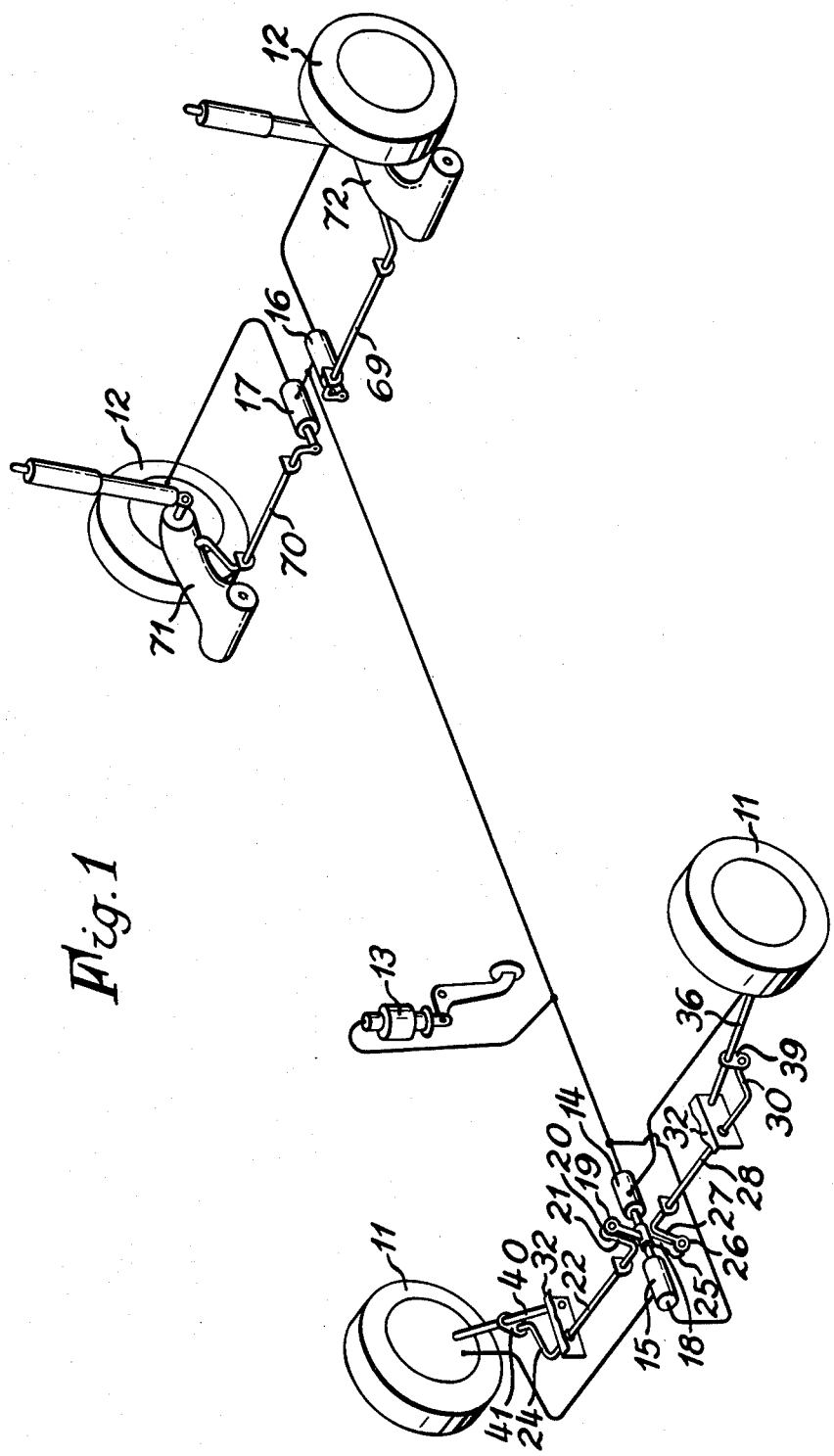
FIG. 1 is a diagrammatic representation in perspective of one form of liquid pressure braking system according to this invention.

In the liquid pressure braking system shown in FIG. 1, each of the motor cylinders (not shown) in which liquid pressure acts to apply brakes to each front wheel 11 or to each rear wheel 12 of the vehicle is connected to a liquid pressure master cylinder 13 through a respective valve device 14, 15, 16 or 17 which controls the liquid pressure which acts within the respective motor cylinder.

The two valve devices 14 and 15, which control liquid pressure which acts within the respective motor cylinders to apply brakes to the front wheels 11 of the vehicle, are coupled together and to the centre of a link 18. One end 19 of the link 18 is pinned to an end 20 of an arm 21 which projects from one end of a torsion bar 22 which is supported upon the vehicle body by spaced supports for rotation about its own longitudinal axis. The arm 21 is normal to the tension bar 22 and to another arm 24 which projects from the other end of the torsion bar 22 and which is normal to the torsion bar 22 as well. The other end 25 of the link 18 is pinned to an end 26 of an arm 27 which projects from one end of another torsion bar 28 which is supported upon the vehicle body by spaced supports for rotation about its own longitudinal axis. The arm 27 is normal to the torsion bar 28 and to another arm 30 which projects from the other end of the torsion bar 28 and which is normal to the torsion bar 28 as well. The two arms 24 and 30 extend from the torsion bars 22 and 28 in the same direction. The torsion bars 22 and 28 are co-axial.

Figure 2:
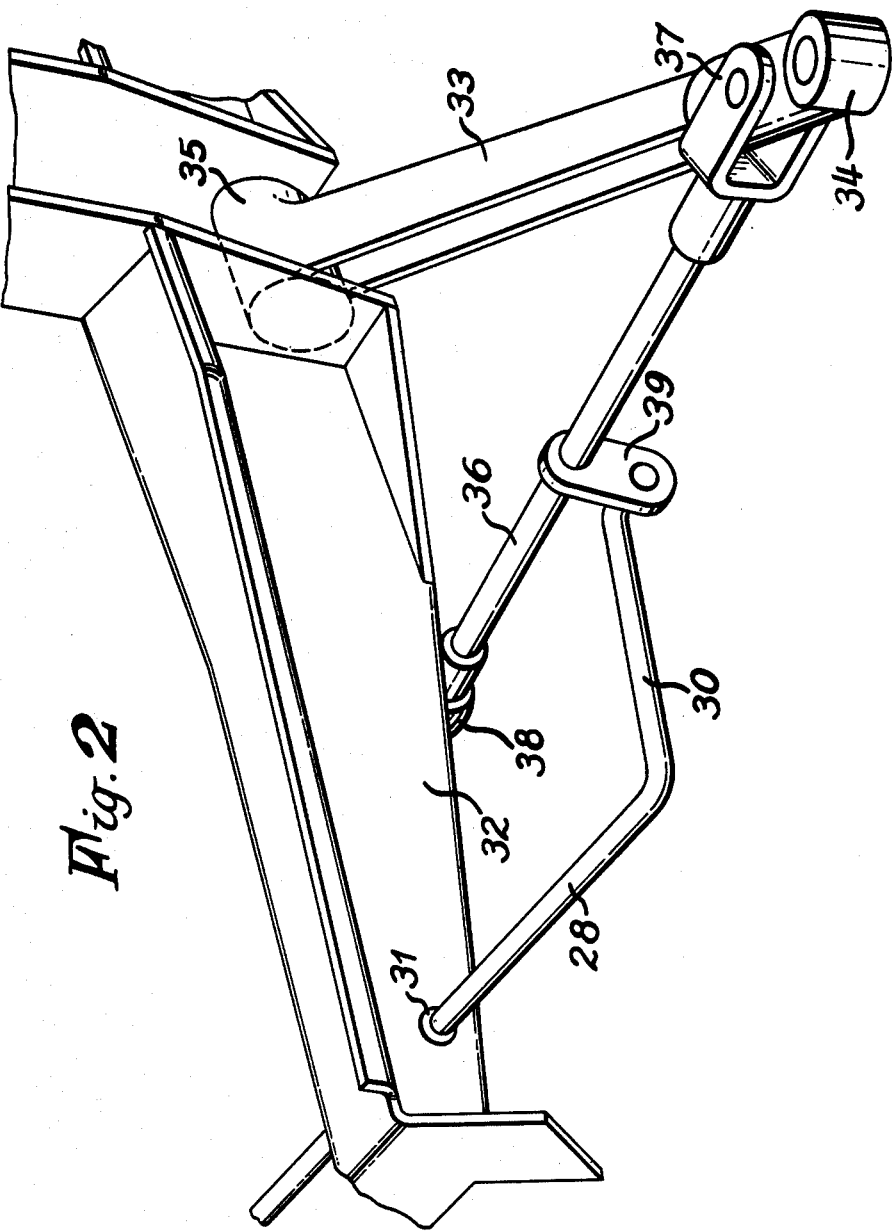
FIG. 2 is a fragmentary view in perspective showing part of the control mechanism for one of the valve devices of the liquid pressure braking system shown in FIG. 1.

FIG. 2 shows that a bearing support 31 for the torsion bar 28 is defined by a part of the vehicle body frame 32. A suspension arm 33 has an outboard end 34, which is apertured to receive the ball pin of a ball and socket joint by which it is joined to the hub of the adjacent front wheel 11, and an inboard end 35 which is pinned to the body frame 32 so that the arm 33 can pivot thereabout with up and down movement of the adjacent front wheel relative to the vehicle body. A tie rod 36, has a clevis 37 at one end, by which it is pinned to the suspension arm 33 adjacent the apertured outboard end 34, and extends forwards from the suspension arm 33 to its other end 38 which is mounted pivotally upon the body frame 32. A connector 39 interconnects the tie rod 36 and the end of the arm 30 remote from the torsion bar 28 so that that end of the arm 30 follows up and down movement of the tie rod 36 with up and down movement of the adjacent front wheel 11 relative to the vehicle body, the arm 30 being connected pivotally to the connector 39. The arm 30 moves angularly about the longitudinal axis of the torsion bar 28 with up and down movement of the adjacent front wheel 11 relative to the vehicle body.

A similar suspension arrangement, including a tie rod 40 (See FIG. 1), to that just described with reference to FIG. 2 is provided for supporting the vehicle body from the hub of the other front wheel 11. Another connector 41 is provided for interconnecting the tie rod 40 and the end of the arm 24 remote from the torsion bar 22. Thus the arm 24 moves angularly about the longitudinal axis of the torsion bar 22 with up and down movement of the adjacent front wheel 11 relative to the vehicle body.

Figure 3:
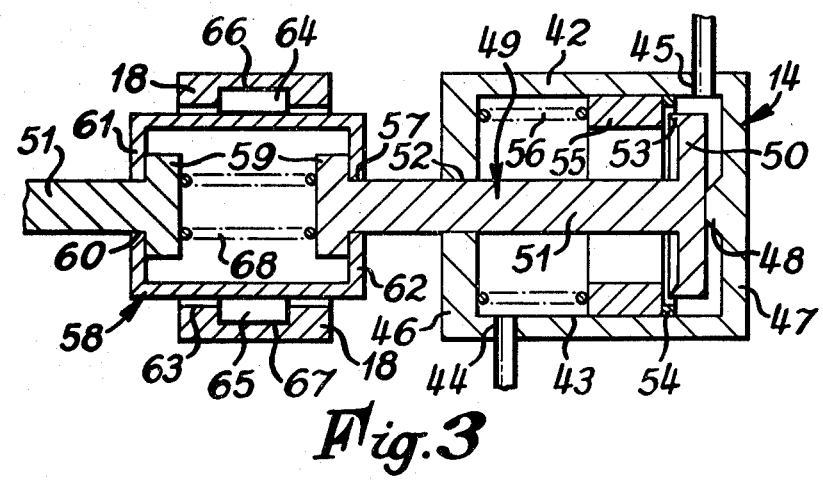
FIG. 3 is a diagrammatic transverse section of one form of valve device for the liquid pressure braking system shown in FIG. 1.

Referring now to FIG. 3, the valve device 14 comprises a body 42 which is mounted on the body of the vehicle and which defines a cylindrical chamber 43, an inlet port 44 and an outlet port 45. The inlet port 44 is adjacent one end wall 46 of the cylindrical chamber 43 and the outlet port 45 is adjacent to the other end wall 47 of the cylindrical chamber 43. The end wall 47 has a central projection 48.

A movable valve member 49 has a circular valve head 50 and an axial stem 51 which extends through and slides within a central aperture 52 in the cylinder end wall 46, the valve head 50 being mounted co-axially on the end of the valve stem 51 within the cylindrical cavity 43. The valve head 50 defines an annulus 53 around its periphery, the annulus projecting towards the end wall 46.

A circumferential stop 54 is fast with the cylindrical wall of the cylindrical cavity 43 between the ports 44 and 45 and adjacent to the outlet port 45. An annular piston 55 slides within the cylindrical cavity 43 and is urged against the stop 54 by a coil spring 56 which reacts against the end wall 46. The inside diameter of the annular piston 55 is less than the diameter of the annulus 53. The stop 54 is positioned so that, when the valve head 50 abuts the central projection 48 and the annular piston 55 abuts the step 54, the annulus 53 is spaced from the annular piston 55 to define a passage by which the inlet port 44 communicates with the outlet port 45.

The construction of the valve device 15 is similar to that of the valve device 14 and will not be described herein in detail. Like parts of the two valve devices 14 and 15 will be identified by the same reference numerals in the following description. The construction of each of the valve devices 14 and 15 is that of a well known kind of pressure reducing valve which is arranged so that, when the liquid pressure which acts to apply brakes to the respective wheel reaches the level at which the liquid pressure loading on the valve member 49 overcomes a biassing load which urges the valve member 49 towards the end wall 47, the valve member 49 moves to engage the annulus 53 with the annular piston 55 so as to close the path of communication between the inlet port 44 and the outlet port 45. When the liquid pressure at the inlet port 44 is increased further by a small amount, the differential liquid pressure loading on the valve member 49 is sufficient to separate the annulus 53 from the annulus piston 55 and further liquid is fed to the outlet port 45. However the annulus 53 immediately re-enages the annular piston 55 due to increased pressure at the outlet port 45. Hence the pressure at the outlet port 45, which is the pressure that acts to apply brakes to the respective wheel, increases at a lower rate than the source pressure once initial engagement of the annulus 53 and the annulus piston 55 has occurred.

The end of the valve stem 51 which is remote from the head 50, extends through and slides within an aperture 57 in a hollow connecting box 58 and carries a radial flange 59 within the box 58. The diameter of the flange 59 is greater than the diameter of the aperture 57.

The end of the valve stem 51 of the valve device 15, which is remote from the respective valve head 50, extends through and slides within an aperture 60 in the hollow connecting box 58 and carries its radial flange 59 within the box 58. The aperture 60 is defined in a wall 61 of the box 58 which is opposite the wall 62 within which the aperture 57 is defined.

The box 58, which is cylindrical, extends through an aperture 63 which extends through the center of the link 18. A diametrically opposed pair of co-axial trunnions 64 and 65 extend radially outwardly from the centre of the box 58 and are engaged in respective cavities 66 and 67 in the inner wall of the aperture 63. Thus the box 58 is supported within the aperture 63 for angular movement about the axis of the trunnions 64 and 65. The axis of the trunnions 64 and 65 is substantially parallel to the axis of the torsion bars 22 and 28.

A coil spring 68, which urges the two end portions of the two valve stems 51 apart and holds the flanges 59 against the respective wall 61, 62 of the box 58, exerts the biassing load upon the valve member 49 of each of the valve devices 14 and 15. The loading of the coil spring 68 is such that, under normal conditions and when the body of the vehicle is substantially horizontal, the biassing load overcomes the fluid pressure loading on each valve member 49 so as to maintain the separation of each valve member 49 and the respective annular piston 55 and thereby ensure that neither valve member 14 or 15 functions to reduce the liquid pressure that acts to apply brakes to the front wheels 11.

Figure 4:
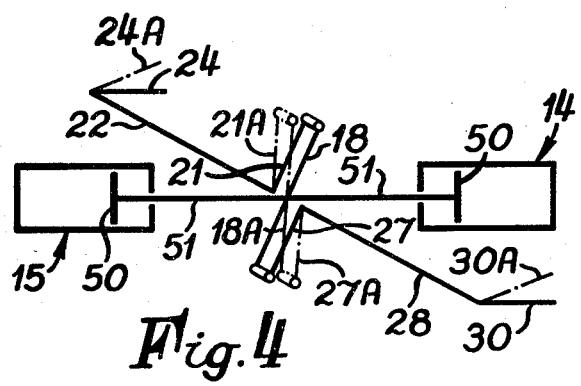
FIG. 4 is a diagram illustrating operation of part of the liquid pressure braking system illustrated in FIG. 1 when both front wheels pass over the same bump.

Referring to FIGS. 1 and 3 in conjunction with FIG. 4, when both front wheels 11 of the vehicle are driven over the same bump, or when the brakes are operated whilst the loading on the two front wheels 11 is increased substantially equally due to load transfer from the rear of the vehicle, the two arms 24 and 30 are deflected relative to the vehicle body through the same angle and in the same direction to, say, positions 24A and 30A respectively. At the same time arms 21 and 27 are rotated through the same angle and in the same sense to positions 21A and 27A respectively. In consequence, the arm 18 is rotated about axis of the trunnions 64 and 65 to position 18A without that axis being translated. Thus the magnitude of the biassing load which acts upon each valve member 49 of the two valve devices 14 and 15 is unaltered and the condition of the valve devices 14 and 15 is unchanged.

Figure 5:
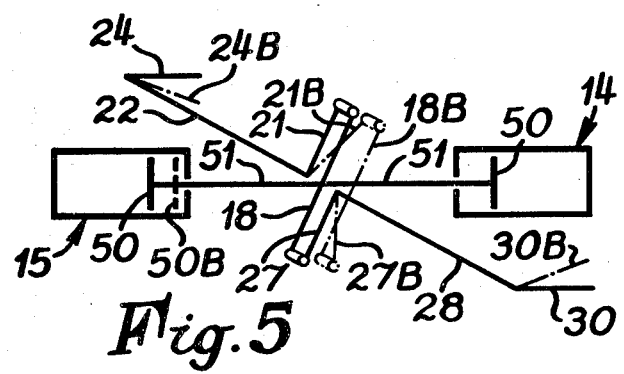
FIG. 5 is a diagram similar to FIG. 4 illustrating operation of that part of the liquid pressure braking system illustrated in FIG. 1 when the vehicle rolls about its longitudinal axis.
Figure 6:
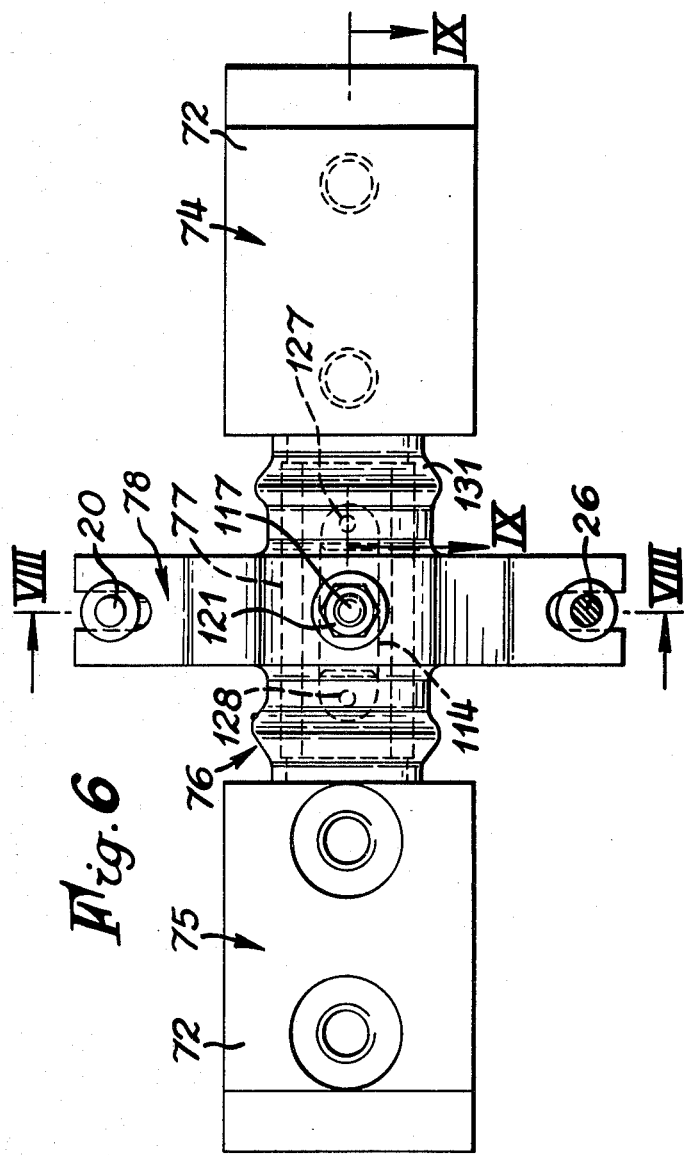
FIG. 6 is a side view mainly in elevation of the assembly of the two valve devices, which control liquid pressure which acts to apply brakes to the front wheels of the vehicle in the liquid pressure braking system shown in FIG. 1, and another form of control mechanism of those two valve devices.

Referring now to FIGS. 1 and 3 in conjunction with FIG. 5, when the vehicle body rolls about its longitudinal axis, for example, when the vehicle is driven around a bend or a corner, so that the load carried by the outboard of the two front wheels is increased and the load carried by the inboard of the two front wheels is reduced, the two arms 24 and 30 are deflected relative to the vehicle body in opposite directions to, say, positions 24B and 30B respectively. For the convenience of this description it has been assumed that the outboard front wheel 11 is the wheel 11 that has its brake applied by the motor cylinder to which the supply of liquid pressure is controlled by the valve device 14. If the brakes are not applied, the force exerted by the spring 68 to urge the two valve members 49 apart is greater than the sum of the forces applied to the ends of the link 18 by the arms 21 and 27 of the two torsion bars 22 and 28 so that the arms 21 and 27 are held against angular movement with the arms 24 and 30, and the two torsion bars 27 and 28 are distorted torsionally.

However, if the master cylinder 13 is operated to apply the brakes, the liquid pressure loading on each of the valve members 49 acts in opposition to the spring 68 so that the effective force which opposes angular movement of the arms 21 and 27 with angular movement of the arms 24 and 30 is lower than is the case when the brakes are not applied. The torsional stiffness of the torsion bars 22 and 28 is sufficient to ensure that the arms 21 and 27 do move angularly to positions 21B and 27B with angular movement of the arms 24 and 30 when the brakes are applied. Angular movement of the arms 21 and 27 to positions 21B and 27B results in translational movement of the link 18 to the new position 18B, such movement being towards the valve device 14 that controls the liquid pressure that acts in motor cylinders to apply brakes to the outboard of the two front wheels 11. Such translational movement of the link 18 carries the box 58 with it so that the valve member 50 of the other valve device 15, that controls liquid pressure that acts in motor cylinders to apply brakes to the inboard of the two front wheels 11, is drawn away from its abutment 48 and moved towards the rspective end wall 46. The annulus 53 of the valve member 50 of the valve device 15 is engaged with the annular piston 55 of that valve device 15 so as to close communication between the inlet port 44 and the outlet port 45 of the valve device 15.

If the master cylinder 13 is operated to apply the brakes whilst the vehicle is being driven around such a bend or corner, the valve device 15 acts as a pressure reducing valve in the manner described above so that the pressure which is transmitted to the motor cylinder or cylinders which operate to apply brakes to the inboard front wheel 11 increases at a lower rate than does master cylinder pressure once the annulus 53 of the valve device 15 has engaged the annular piston 55 of the valve device 15 initially.

If the brakes are applied before the vehicle is driven into such a bend or corner, or if the vehicle is accelerated whilst it is being driven around such a bend or corner and the liquid pressure has been transmitted through both valve devices 14 and 15 and built up in the associated motor cylinders so that the brakes are applied to both front wheels 11, albeit so that the applied brake pressure acting on the outboard front wheel 11 is higher than that which acts on the inboard front wheel 11, the consequent movement of the torsion bars 22 and 28 and of the link 18 results in the valve member 49 of the valve device 15 being moved away from the end wall 47. Such movement of the valve member 49 not only carries the respective annular piston 55 with it, against the action of the respective coil spring 56, but increases the volume of the space defined between the valve head 50 and the end wall 47 of the valve device 15 so that the pressure of liquid within the associated motor cylinders, which are in communication with the said space through the respective outlet port 45 is reduced. It will be appreciated that, at the same time, the biassing load applied to the valve member 49 of the other valve device 14 by the coil spring 68 is increased because the coil spring 68 is compressed.

When the vehicle body reassumes a level attitude, the link 18 is returned to its normal position and such return movement is accompanied by return movement of the box 58 and the two valve members 49 and annular pistons 55 under the influence of the respective coil springs 68 and 56.

It will be understood that when the vehicle is driven round a bend and the front wheel 11 that has its brake applied by a motor cylinder to which the supply of liquid pressure is controlled by the valve device 15 is the outboard front wheel 11 of the vehicle, the link 18 is moved towards the valve device 15. The spring 68 provides a force which tends to oppose rolling movement of the vehicle body away from the normal level attitude and which provides a restoring force which tends to return the body to that position when the body has rolled. Hence the assembly which comprises the link 18, the two torsion bars 22 and 28, the hollow connecting box 58 and the spring 68 tends to act in the manner of a conventional anti-roll bar.

Each of the valve devices 16 and 17 which control liquid pressure which acts to apply brakes to each rear wheel 12 of the vehicle conveniently is similar to each of the valve devices 14 and 15 but is subjected to a biassing load which is independent of the biassing load exerted upon the other of the two valve devices 16 and 17. The biassing load, which acts upon the valve member 49 of each of the valve devices 16 and 17 to hold it against the respective abutment 48 is exerted by a respective torsion bar 69, 70 which has an arm at its other end coupled to a respective trailing suspension arm 72, 71 so that the arm at that other end of each torsion bar 69, 70 rotates about the longitudinal axis of that torsion bar 69, 70 with up and down movement of the adjacent rear wheel 12 relavie to he adjacent rear wheel 12. Thus the biassing load which acts upon the valve member 49 of each valve device 16, 17 is related to the load that is supported by the respective rear wheel 12 and each valve device 16, 17 acts as a pressure reducing valve in the manner described above so that, once the liquid pressure which acts to apply brakes to the respective rear wheel 12 has reached the level at which the liquid pressure loading on the valve member 49 overcomes the biassing load, that liquid pressure increases at a lower rate than does master cylinder pressure.

It is not necessary to increase the biassing load applied to the valve member 49 of the valve device that controls the liquid pressure that is fed to the outboard of the two front wheels 11 when the vehicle body rolls about its longitudinal axis as the behicle is being driven around a band or corner because the spring 68 is sufficient to ensure that the annulus 53 remains separated from the annular piston 55 of that device as long as master cylinder pressure does not exceed that which provides maximum braking effort without undue wheel locking when the vehicle is being driven on a road surface which allows the types to engage that road surface with an acceptable frictional grip. It is sufficient to decrease the biassing load that acts to oppose closure of the valve device that controls the liquid pressure that is fed to the inboard of the two front wheels, that is to say the front wheel that is subjected to decreased load when the vehicle is driven round such a bend or corner.

FIGS. 6 to 9 illustrate an assembly of valve devices 74 and 75 and associated control mechanism 76 for use in place of the valve devices 14 and 15 and the link 18 in the liquid pressure braking system that is shown in FIG. 1 and which operates to decrease the biassing load that acts to oppose closure of the valve device 74, 75 that controls the liquid pressure that is fed to the inboard of the two front wheels 11 when the vehicle is driven round a bend or corner without changing the biassing load that acts to oppose closure of the valve device 74, 75 that cntrols the liquid pressure that is fed to the outboard of the two front wheels 11. The two valve devices 74 and 75 are identical and corresponding parts thereof will be identified hereinafter by the same reference numerals.

The control mechanism 76 comprises a flatsided tubular crosshead 77 which connects the valve bodies 72 of the two valve devices 74 and 75 together and passes through a central aperture 73 defined by a link 78 which is composed of two cranked strips 79 and 80. The end portions of the two strips 79 and 80 are slotted. The end 20 of the arm 21 carries a shouldered bush 81 which is located within the slot that is formed at one end of the link 78 by the respective slotted end portions of the strips 79 and 80. The end 26 of the arm 27 carries a shouldered bush 82 which is located within the slot that is formed at the other end of the link 78 by the respective slotted end portions of the strips 79 and 80.

Referring now to FIG. 9 the valve body 72 of the valve device 74 defines a stepped through bore, the largest diameter portion 83 of the through bore being at the end of that bore that is further from the other valve device 75 and being spaced from the smallest diameter portion 84 of the through bore by a portion 85 of medial diameter. The smallest diameter bore portion 84 is at the end of the through bore that is nearer to the other valve device 75. The outer end of the largest diameter bore portion 83 is closed by a closure member 86 which is prevented from being moved through the mouth of the largest diameter bore portion 83 by a circlip 87.

A stepped plunger 88 has its smallest diameter portion 89 engaged for sliding movement in the smallest diameter bore portion 84 and its largest diameter portion 90 engaged for sliding movement in the medial diameter bore portion 85. The plunger 88 projects towards the valve device 75 through the mouth of the smallest diameter bore portion 84. A cylindrical boss 91 which is formed on the valve body 72 defines the mouth of the smallest diameter bore portion 84. An open-ended axial slot 92 is defined by the end portion of the plunger 88 that projects outwardly from the smallest diameter bore 84.

A medial diameter portion 93 of the plunger 88 separates the smallest and largest portions 89 and 90 of that plunger 88 and ensures that there is always an annular space 94 defined within the medial diameter bore portion 85 around the plunger 88. An inlet port 95, which is defined wthin the valve body 72, communicates with the annular space 94.

There is a diametral passage 96 through the medial diameter plunger portion 93. An axial passage 97 extends from the diametral passage 96, with which it communicates, to a mouth in the end of the plunger 88 remote from the slot 92. The outer end of the axial passage 97 is rebated and tapped to receive an annular insert 98 which is screwed therein. A valve member 99 has a radial flange 100 and a pin 101 which extends through a central aperture 102 of the annular insert 98. The diameter of the aperture 102 is greater than the diameter of the pin 101. The surface of the flange 100 that faces the aperture 102 is spherical and is adapted to co-operate with a tapered annular surface portion 103 of the annular insert 98 which surrounds the inner end of the central aperture 102 and serves as a valve seat so that the passageway through the central aperture 102 is closed when the radial flange 100 is seated thereon. A coil spring 104 reacts against the shoulder that is defined between the rebated portion of the axial passage 97 and the remainder of that paassage 97 and urges the valve member 99 towards the closure member 86.

The annular insert 98 has a radial flange 105 outside the passage 97. A washer 106 is located radially by engagement upon an annular shoulder 107 which is formed at the end of the plunger 88 that is nearer to the closure member 86 and is located axially by having its radially inner peripheral portion trapped between the plunger 88 and the radial flange 105. Another washer 108 slides upon the plunger 88. A concentric pair of coil springs 109 and 110 react against the washer 106 to hold the washer 108 against the shoulder that is defined between largest ano medial diameter bore portions 83 and 95, the reaction being transmitted through the washer 106 to the plunger 88 and the annular insert 98 so that the plunger 88 and the annular insert 98 are urged towards the closure member 86. Normally the annular insert 98 abuts the closure member 86 so that the valve member 99 is held by the closure member 86 against the action of the coil spring 104 and the radial flange 100 is spaced from the annular valve seat 103. Radial grooves 111 are formed in the end face of the annular insert 98 that abuts the closure member 86 so that the central aperture 102 is always in communication with the annular space 112 that surrounds the plunger 88 within the largest diameter bore poriton 83. An outlet port 113, which is defined by the valve body 72, comunicates with the annular space 112.

Figure 7:
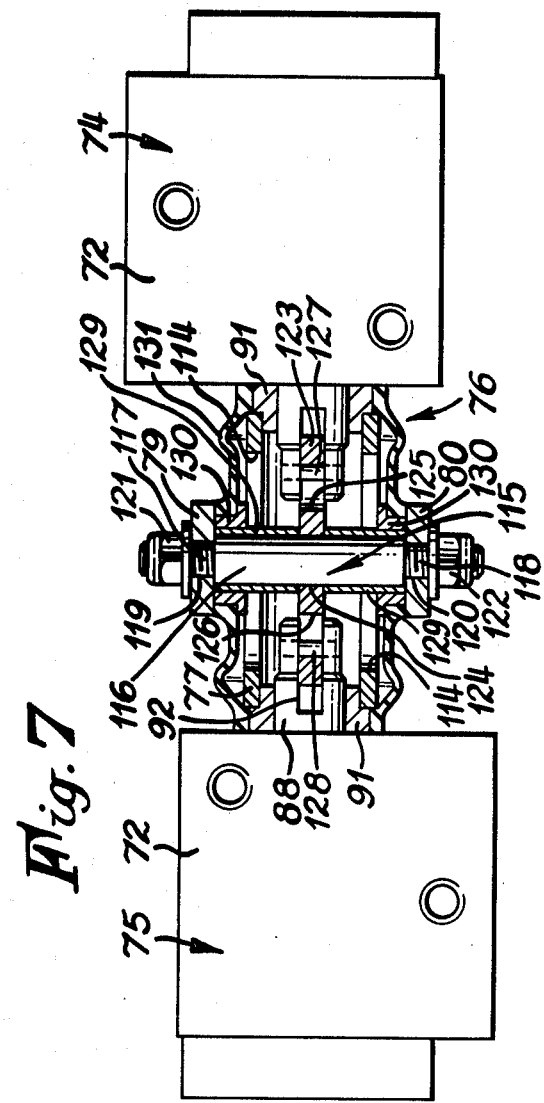
FIG. 7 is a sectional plan view of the assembly shown in FIG. 6, the two valve devices being shown in elevation for convenience.
Figure 8:
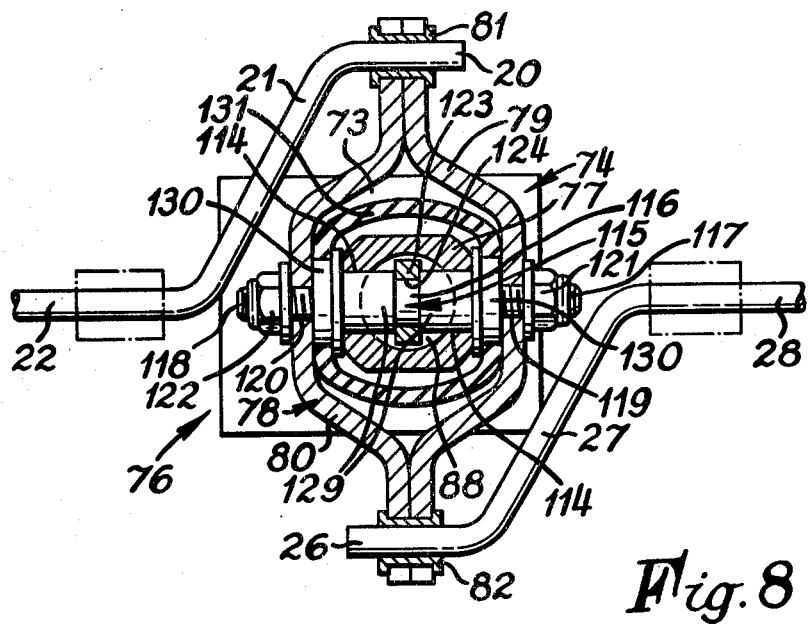
FIG. 8 is a section on the line VIII—VIII of FIG. 6.

FIG. 7 shows that the cylindrical boss 91 of each valve device 74, 75 is spigotted into the respective open end of the tubular crosshead 77. The crosshead 77 has an opposed pair of elongate slots 114. A pivot pin 115 has a plain cylindrical central portion 116 which extends between the opposed midpoints of the two flat central portions of the cracked strips 79 and 80, passing through the opposed pair of elongate slots 114. A threaded stud 117, 118 projects coaxially from either end of the pivot pin central portion and passes through a respective plain hole 119, 120 formed at the centre of the adjacent cranked strip 79, 80. A self locking nut 121, 122 is screwed onto each threaded stud 117, 118 and holds the central portion of the respective cranked strip 79, 80 against the shoulder that is defined between the threaded stud 117, 118 and the cylindrical central portion 116 of the pivot pin 115.

An elongate flat plate 123 has a central aperture 124 into which the cylindrical central portion 116 of the pivot pin 115 is journaled. The plate 123 is substantially normal to the axis of the pivot pin 115 and is positioned substantially at the centre of the pivot pin 115. The central aperture 124 is midway between an aligned pair of elongate slots 125 and 126. One end portion of the plate 123, including a major part of the nearer slot 125, is received within the open-ended axial slot 92 that is formed in the exposed end of the valve plunger 88 of the valve device 74. A diametral pin 127, which is anchored within that exposed plunger portion so as to extend across the slot 92, passes through the slot 125. The diameter of the pin 127 is less than the length of the slot 125. The other end portion of the plate 123, including a major part of the nearer slot 126, is received within the open-ended axial slot 92 that is formed in the exposed end of the valve plunger 88 of the valve device 75. A diametral pin 128, which is anchored within the exposed plunger portion of the valve device 75 so as to extend across the respective slot 92, passes through the slot 126. The diameter of the pin 128 is less than the length of the slot 126. The arrangement of the pins 127 and 128 and the slots 125 and 126 is such that, when the pivot pin 115 is midway between the valve devices 74 and 75, each pin 127, 128 is at the end of the respective slot 125, 126 remote from the pivot pin 115.

That part of the cylindrical central portion 116 of the pivot pin 115 which extends between the elongate flat plate 123 and either of the cranked strips 79 and 80, is surrounded by a respective tubular spacer 129, the length of each spacer 129 being selected so that that spacer 129 is not loaded in compression by being clamped between the elongate plate 123 and the respective cranked strip 79, 80. Each spacer 129 is spigotted into a respective annular bush 130 which is located between the central portion of the respective cranked strip 79, 80 and the adjacent flat side surface of the tubular crosshead 77. A tubular flexible boot 131 surrounds the tubular crosshead 77 and has each of its ends located upon the cylindrical boss 91 of the respective valve device 74, 75. The annular bosses 130 project through the flexible boot 131 so that the cranked strips 79 and 80 and the locknuts 121 and 122 are outside the boot 131.

The control mechanism 76 operates in basically the same way as does the control mechanism which has been described above with reference to FIGS. 1 to 4 of the drawings. When both front wheels 11 are drawn over the same bump, the assembly of the link 78 and pivot pin 115 rotates about the axis of the pivot pin 115 relative to the elongate flat plate 123 without moving the elongate flat plate 123 so that the two valve devices 74 and 75 remain in the condition described above with reference to FIG. 9. Hence the supply of liquid under pressure from the master cylinder 13 to the motor cylinders which operate brakes on the front wheels 11 is not impeded by either valve device 74 or 75 because the liquid pressure loading on the valve plunger 88 of each of the valve devices 74 and 75 is insufficient to overcome the loading of the respective pair of coil springs 109 and 110. On the other hand, when the vehicle rolls about its longitudinal axis, the pivot pin 115 is urged towards the valve device 74 or 75 which controls the supply of liquid under pressure to the motor cylinders which apply the brakes to the front wheel 11 that is subjected to the increased loading. The force urging the pivot pin 115 in that direction is transmitted through the elongate flat plate 123 and the diametral pin 127 or 128 that is carried by the valve plunger 88 of the other valve device 74 or 75 and applied to that valve plunger 88 to oppose the action of the respective pair of coil springs 109 and 110 on that valve plunger 88. The force exerted on that valve plunger 88 by the respective pair of coil springs 109 and 110 is also opposed by the liquid pressure loading which acts upon that plunger 88 when the brakes are applied. If the sum of the force urging the pivot pin 115 towards the valve device 74, 75 which controls the supply of liquid under pressure to the motor cylinders which operate brakes on the front wheel 11 that is subjected to the increased loading and the fluid pressure loading on the valve plunger 88 of the other valve device 74, 75 exceeds the spring load exerted by the pair of coil springs 109 and 110 of that other valve device 74, 75, the pivot pin 115, elongate plate 123 and the valve plunger 88 of that other valve device 74, 75 will move as one in the direction which separates the annular insert 98 that is carried by that valve plunger 88 from the respective closure member 86. Thus the respective valve member 99 will be seated upon the co-operating valve seat 103 by the respective coil spring 104 to close communication between the inlet port 95 and the outlet port 113 of that other valve device 74, 75. Unless the loading exerted upon the valve plunger 88 via the pivot pin 115 is increased also, a further increase in the fluid pressure at the inlet port 95 of that other valve device 74, 75 will change the differential liquid pressure loading on that valve plunger 88 sufficiently to return that valve plunger 88 towards the respective closure member 86 and unseat the respective valve member 99. Subsequent operation of that other valve device 74, 75 under such conditions will be apparant from the foregoing description. If the brakes are applied before the vehicle is driven into a bend or corner and are held applied as that vehicle is driven around that bend or corner, the plunger 88 of the valve device 74, 75 that controls liquid pressure that is fed to the motor cylinders which operate to apply brakes to the inboard front wheel 11 will be drawn away from the respective closure member 86 if the liquid pressure that acts in those motor cylinders is sufficiently high for the load exerted by two coil springs 109 and 110 to be overcome, the plunger 88 carrying the respective valve member 99 with it during such movement, the valve member 99 being seated so that the liquid pressure that acts in those motor cylinders is reduced by such movement of the plunger 88.

It will be appreciated that, when the pivot pin 115 is urged away from one of the valve devices 74, 75 as described above, it will not exert any thrust upon the valve plunger 88 of the other valve device 74, 75 because of the arrangement of the respective pin 127, 128 and elongate slot 125, 126.

FIG. 10 shows a valve device 132 which is similar to the valve device 74 shown in FIG. 9 and which is suitable for use in place of each of the valve devices 16 and 17 in the fluid pressure braking system shown in FIG. 1. Parts of the valve device 132 which correspond to like parts of the valve device 74 are identified by the same reference numeral. It will be noted that the pair of coil springs 109 and 110 of the valve device 74 and their associated washers 106 and 108 are omitted form the valve device 132. The stepped bore of the valve device 132 differs from that of the valve device 74 in that an additional bore portion 133 is included between the largest diameter bore portion 83 and the medial diameter bore portion 85, the diameter of the additional bore portion 133 being greater that that of the medial diameter bore portion 85 and less than that of the largest diameter bore portion 85. The stepped plunger 134 of the valve device 132 also differs from the stepped plunger 88 of the valve device 74 in that the portion 135 which slides in the medial diameter bore portion 85 is not the largest diameter plunger portion. The largest diameter plunger portion 136 is housed within the bore portions 133 and 83 and is arranged so that the shoulder between the two plunger portions 135 and 136 co-operates with the shoulder between the two bore portions 85 and 133 to limit movement of the stepped plunger 134 away from the closure member 86. The operation of the valve device 132 will be apparent from the foregoing description with reference to FIGS. 1 and 9 of the accompanying drawings.

The control mechanisms for controlling the valve devices that control liquid pressure which acts within the respective motor cylinders to apply brakes to the front wheels 11 of the vehicle that have been described so far with reference to FIGS. 1 to 9 of the accompanying drawings include a link which is rotated freely about an axis when relative movement between the vehicle body and one of the front wheels 11 of the vehicle is substantially the same as the relative movement between the vehicle body and the other front wheel 11 of that vehicle. The forces that are transmitted to that link in response to the relative movement of the vehicle body and the front wheels 11 of the vehicle when such relative movement between the body and one of the front wheels 11 is not the same as the relative movement between the vehicle body and the other front wheel of the vehicle, are applied to the link in the same sense so that the link itself is urged in that sense. The combined forces that are applied to the link in the latter circumstances are applied to the valve plunger of the valve device that controls liquid pressure which is fed to the motor cylinder or cylinders that act to apply brakes to the front wheel 11 that is laden more lightly than the other front wheel 11. Those combined forces act to reduce the biassing load that acts on that valve plunger so that the magnitude of the biassing load that opposes movement of the valve plunger to close the valve and shut off the supply of liquid pressure to the respective motor cylinder or cylinders is reduced. Another form of control mechanism for effecting similar performance of the valve devices which control liquid pressure which acts within the respective motor cylinder or cylinders to apply the brakes to the front wheels of the vehicle under like conditions will be described now with reference to FIGS. 11 and 12. This mechanism has been designed especially for ease of installation upon an existing motor car.

Figure 11:
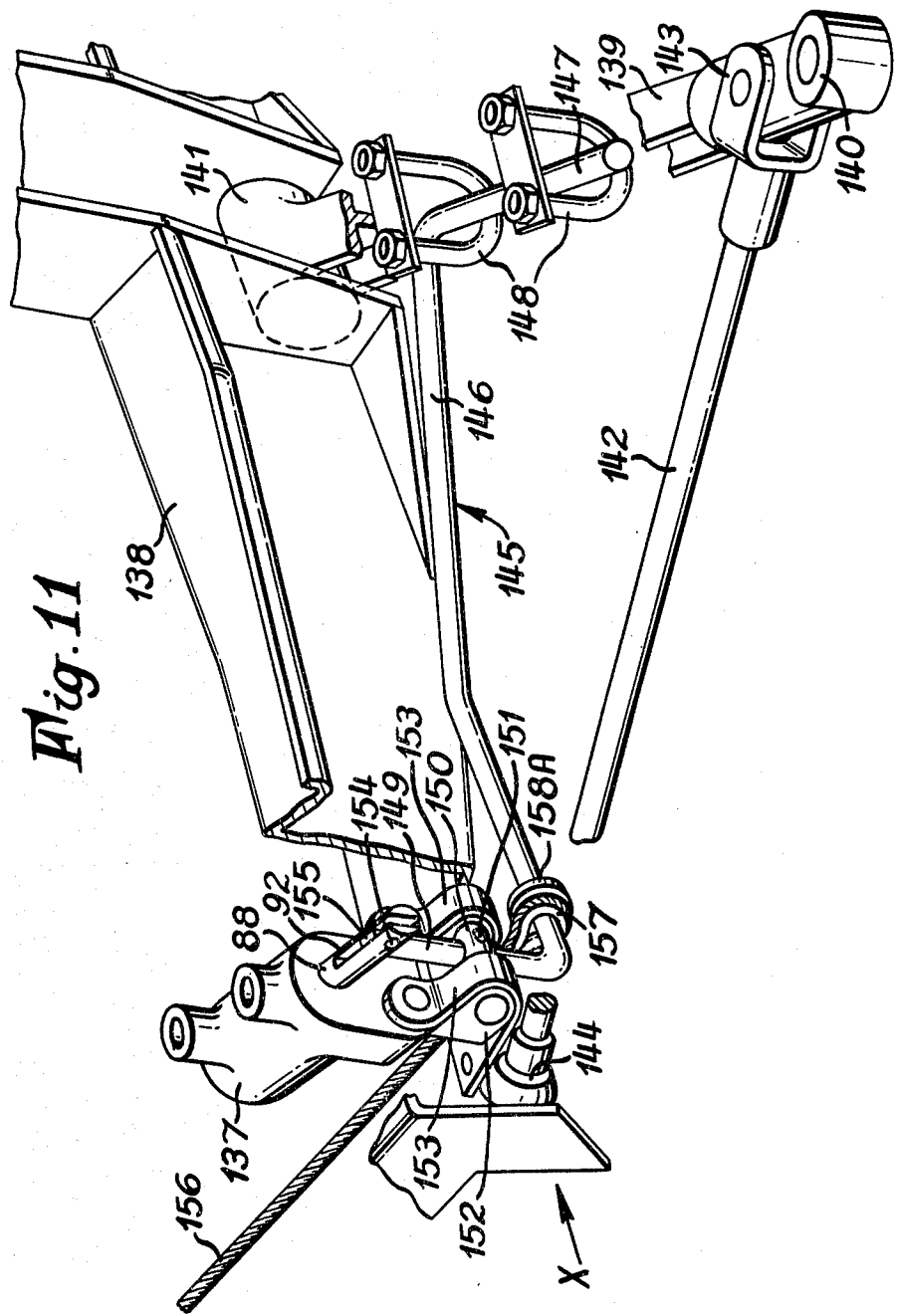
FIG. 11 is a view similar to FIG. 2 and illustrates another form of control mechanism for the valve device of another form of liquid pressure braking system according to this invention, the valve device being operable to control liquid pressure which acts to apply a brake to the respective one of the front wheels.

FIGS. 11 and 12 show the valve device 137, which controls liquid pressure which acts in motor cylinders to apply brakes to the left front wheel 11 of the motorcar, mounted on part of a body frame 138 of the motorcar, which is similar to the body frame 32 shown in FIG. 2. A suspension arm 139 has an outboard end 140, which is apertured to receive the ball pin of a ball and socket joint by which it is joined to the hub of the adjacent left front wheel 11, and an inboard end 141 which is pinned to the body frame 138 so that the arm 139 can pivot thereabout with up and down movement of the adjacent front wheel relative to the vehicle body. A tie rod 142 has a clevis 143 at one end, by which it is pinned to the suspension arm 139 adjacent the apertured outboard end 140, and extends forwards from the suspension arm 139 to its other end 144 which is mounted pivotally upon the body frame 138.

A torsion bar 145 has a cranked centre portion 146, a straight end arm 147, which is clamped to the underside of the suspension arm 139 by U bolts 148 and projects outwardly from one end of the centre portion 146, and an angled end arm 149 which projects substantially upwardly from the other end of the cranked centre portion 146. The outer limb of the angled arm 149 carries a pivot pin 150 which projects laterally from the arm 149 in both directions and which is fixed to the arm by a pin 151. The pivot pin 150 is supported for pivotal movement about its longitudinal axis by a D section bearing block 152 which is clamped to the body frame 138 below the valve device 137 by a pair of strip steel brackets 153 which are bolted to the body frame 138. The arm 149 extends through a slot in the D shaped bearing block 152, the dimensions of the slot being sufficient to allow angular movement of the arm 149 about the longitudinal axis of the pivot pin 150.

The internal construction of the valve device 137 is similar to that of the valve device 74 which has been described above in detail with reference to FIG. 9 of the accompanying drawings. Corresponding parts of the valve devices 74 and 137 will be identified by the same reference numerals. The plunger 88 of the valve device 137 has a diametral pin 154 which extends across the slot 92, the diametral pin 153 being nearer to the open end of the slot 92 than to the base thereof. The angled arm 149 of the torsion bar 145 has a parallel sided tongue 155 at its end, the tongue 155 projecting into the slot 92 between the peg 154 and the base of the slot 92.

A similar valve device 137A (not shown) controls liquid pressure which acts within the respective motor cylinder or cylinders to apply brakes to the right front wheel 11 of the motorcar. For convenience of description, the components of the control mechanism that are associated with the valve device 137A will be given the same numeral references as the corresponding parts shown in FIGS. 11 and 12 and they will be distinguishable from the corresponding parts shown in FIGS. 11 and 12 by the suffix 'A'. That other valve device 137A is mounted on the body frame 138A on the other side of the motorcar adjacent to the right front wheel 11 and is associated similarly with another cranked torsion bar 145A which is similar to the cranked torsion bar 145. It will be apparent that the assembly of the other valve device 137A, body frame 138A, torsion bar 145A and suspension arm 139A will look like the mirror image of the assembly shown in FIG. 12 when seen from the front of the motorcar.

A multi-strand wire cable 156 connects the two torsion bars 145 and 145A together. The cable 156 has an eye 157 at each end. That part of the cranked centre portion 146, 146A of each torsion bar 145, 145A which is next to the angled arm 149, 149A of that torsion bar 145, 145A passes through the respective eye 157. The eye 157 at each end of the cable 156 is restrained against movement away from the adjacent angled arm 149, 149A of the respective torsion bar 145, 145A by a respective collar 158A, 158AA which is fixed to the torsion bar 145, 145A. The cable 156 includes a suitable tensioning device (not shown), such as a screw type tensioner.

When the control mechanism has been assembled upon the car, the car is jacked up with both front wheels 11 hanging and the tensioning device carried by the cable 156 is adjusted until the tongue 155, 155A at the outer end of each angled arm 149, 149A just touches the adjacent diametral pin 154, 154A but without exerting a force upon that pin 154, 154A sufficient to act in opposition to the spring loading exerted by the pair of coil springs 109 and 110 of the respective valve device 137, 137A.

When both front wheels 11 of the vehicle are driven over the same bump, each suspension arm 139, 139A is pivoted upwards relative to the vehicle body frame 138, 138A about the pivot axis of the inboard end 141. The outer straight arm 147, 147A of each torsion bar 145, 145A is deflected with such pivotal movement of the respective suspension arm 139, 139A. Such deflection of the outer straight arm 147, 147A of both torsion bars 145 is accompanied by the application of a tensile load to the respective end of the cable 156, increasing the tension in that cable 156. The cable 156 is relatively rigid in tension so that it holds the engaged parts of the torsion bars 145, 145A and thereby restrains the angled arms 149, 149A of both torsion bars 145, 145A from moving angularly about the longitudinal axis of the respective pivot pin 150.

Thus the forces applied to the torsion bars 145, 145A by equal up and down movement of the front wheels 11 relative to the body of the motocar, which are accompanied by like up or down deflection of the outer straight arms 147, 147A of each torsion bar 145 145A result simply in torsional strain of the torsion bar 145, 145A without there being any angular movement of the inner angled arms 149 and 149A of the torsion bars 145 and 145A.

When the motorcar body rolls about its longitudinal axis, for example when the car is driven around a bend or corner, so that the load carried by the outboard of the two front wheels 11 is increased and the load carried by the inboard of the two front wheels 11 is reduced, the suspension arms 139, 139A pivot in opposite directions relative to the body frame 138, 138a. The inboard suspension arm 139, 139A pivots downwardly about the pivot axis of its inboard end 141, 141A whilst the outboard suspension arm 139, 139A pivots upwardly about its inboard pivot axis 141, 141A. The straight arm 147, 147A at the end of each torsion bar 145, 145A will be deflected pivotally with such pivotal movement of the respective suspension arm 139, 139A to which it is fixed. Thus the two torsion bars 145 and 145A tend to rotate in the same angular sense, each about the longitudinal axis of its respective pivot pin 150, 150A. The tongue 155, 155A of the torsion bar 145, 145A on the inboard side of the motorcar acts upon the respective diametral pin 154, 154A to urge the respective valve plunger 88 outwardly with respective to the body of the respective valve device 137, 137A. Thus the biassing load that acts within that valve device 137, 137A to oppose closure of the valve and shutting off of the supply of liquid pressure to the motor cylinder or cylinders which act to apply brakes to the inboard front wheel 11 is reduced. The angled arm 149, 149A of the torsion bar 145, 145A on the outboard side of the motorcar will be moved in the same angular sense as the angled arm 149, 149A of the inboard torsion bar 145, 145A. Such angular movement of the angled arm 149, 149A of the outboard torsion bar 145, 145A will move its tongue 155, 155A out of contact with the diametral pin 154, 154A of the respective valve plunger 88. Thus the biassing load that acts upon the plunger 88 of the valve device 137, 137A that controls liquid pressure which acts in the respective motor cylinder or cylinders to apply brakes to the outboard front wheel 11 of the motor car is not reduced.

If the brakes are applied to the front wheels 11 before the vehicle is driven around a bend or corner and those brakes are held applied to those wheels whilst the vehicle is driven around that bend or corner, the angular movement of the angled arm 149, 149A of the inboard torsion bar 145, 145A urges the valve plunger 88 of the valve device 137, 137A, which controls liquid pressure fed to the motor cylinder or cylinders that operate to apply brakes to the inboard front wheel 11 of the motor car, outwardly with respect to the body of that valve device 137, 137A and thus, providing that the liquid pressure which acts in the motor cylinder or cylinders to apply the brakes to that inboard front wheel 11 is high enough, reduces the liquid pressure that acts within the respective motor cylinder or cylinders to apply brakes to the inboard front wheel 11.

Thus the control mechanism for controlling the two valve devices 137, 137A which control liquid pressure which acts in the respective motor cylinder or cylinders to apply brakes to the front wheels 11 of the motor car is arranged so that the two torsion bars 145, 145A are loaded additionally in torsion when the front wheels 11 rise together relative to the body of the motor car because they are driven over the same bump. The additional torsional loads that are applied to the two torsion bars 145, 145A in such circumstances are equal in magnitude and opposite in sense and are reacted by an additional tensile load in the cable 156. Consequently no load is applied by either angled arm 149, 149A to the plunger 88 of the respective valve device 137, 137A. On the other hand, when movement of the motor car body is such that relative movement between the body and one of the front wheels 11 is not the same as the relative movement between that body and the other front wheel 11, the torsional loads applied to the two torsion bars 145 and 145A are unequal in magnitude. The resultant out of balance torque causes the cable 156 to move along its length towards the valve device 137, 137A that controls liquid pressure that acts in the respective motor cylinder or cylinders to apply brakes to the outboard front wheel 11 of the motor car. In such a circumstance the angled arm 149, 149A of the inboard torsion bar 145, 145A acts as a lever and urges the plunger 88 of the valve device 137, 137A which controls liquid pressure that acts in the respective motor cylinder or cylinders to apply brakes to the adjacent inboard front wheel 11 of the motor car, against the action of the respective pair of coil springs 109 and 110 in order to reduce the biassing load which acts upon that plunger 88. Hence the out of balance torque is reacted by compression of that pair of coil springs 109 and 110.

The various embodiments of the invention which have been described so far with reference to FIGS. 1 to 12 of the accompanying drawings, all incorporate valve devices of the so-called pressure-reducing type which are arranged so that, once the liquid pressure which acts to apply brakes to the respective wheel reaches the level at which the liquid pressure loading on the movable valve member overcomes the biassing load, the valve member moves to close the path of communication between the inlet and the outlet of the valve device, a subsequent increase in the liquid pressure at the inlet of the valve device re-opening communication between the inlet and the outlet to further increase the liquid pressure supplied to the respective motor cylinders, the valve member reclosing communication between the inlet and the outlet before the pressure at the outlet reaches that at the inlet so that the pressure that acts to apply brakes to the respective wheel increases at a lower rate than the source pressure once that pressure has reached the level necessary to close communication between the inlet and the outlet initially. A liquid pressure braking system which incorporates valve devices which are arranged so that, once the liquid pressure which acts to apply brakes to the respective wheel reaches the level at which the liquid pressure loading on the movable valve member overcomes the biassing load, the movable valve member moves to close the path of communication between the inlet and the outlet of the valve device, that communication being reopened only when the liquid pressure at the inlet is relieved or when the biassing load is increased, will be described now with reference to FIGS. 13 to 17 of the drawings.

Figure 15:
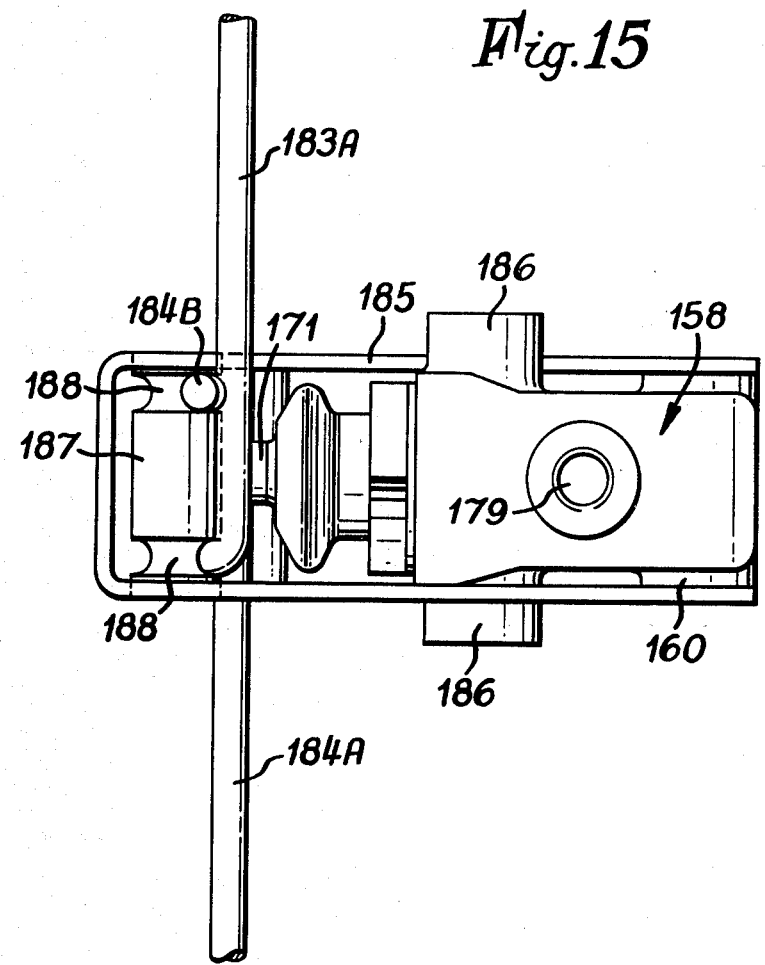
FIG. 15 is a plan view of the assembly shown in FIG. 13.

Referring now to FIGS. 13 to 15, the supply of liquid pressure to the motor cylinder or cylinders which operate to apply brakes to each front wheel 11 of the motorcar is controlled by a respective one of two valve devices 158 and 159 which are housed in a common valve body 160. The construction of the two valve devices 158 and 159 is similar and the valve device 158 will be described now, by way of example, with reference to FIG. 13. Corresponding parts of the two valve devices 158 and 159 will be identified by the same reference numerals in the following description.

The valve device 158 comprises a tubular component which is screwed into one end of a stepped bore which is defined in the valve body 160 and which is closed at its other, smallest diameter end. The smallest diameter bore portion 162 is spaced from the largest diameter bore portion 164, into which the tubular component is screwed, by a medial diameter bore portion 163. The tubular component has a portion 165 of reduced outside diameter which is spigotted into the medial diameter bore portion 163 and which extends into the largest diameter bore portion 164 so that an annular space 166 is defined therearound between the screw-threaded portion 167 of the tubular component and the step between the medial and largest diameter bore portions 163 and 164.

The tubular component has an inwardly-directed annular flange 168 and its end which is nearer to the closed end wall of the stepped bore, the flange 168 being projected axially towards the closed end wall of the stepped bore beyond the end of the remainder of the tubular component to define an annulus 169. A rubber seal 170 surrounds the annulus 169 and defines an annular valve seat.

A valve plunger 171 slides within the bore of the tubular component, projects outwardly through the end thereof that is further from the closed end wall of the stepped bore and has an integral axially-extending pin 172 which extends into the central aperture defined by the flange 168 and the annulus 169. The outside diameter of the pin 172 is less than the inside diameter of both the flange 168 and the annulus 169.

A cup-shaped sheet metal component 173, which has a stepped cylindrical side wall, is housed within the stepped bore between the closed end thereof and the tubular component. The brim of the cup-shaped component 173, which has a larger diameter than the base of that component 173, is held against the end of the tubular component, around the seal 170, by the action of a coil spring 174 which acts upon the outer surface of the step in the cylindrical side wall of the component 173 and reacts against the closed end wall of the stepped bore. A circular disc valve member 175 which has a diameter greater than the diameter of both the seal 170 and the base of the cup-shaped component 173, is housed within the larger diameter portion of the cup-shaped component 173 and is urged towards the seal 170 by a coil spring 176 which reacts against the base of the cup-shaped component 173. The disc valve member 175 has an axial stem 177 which projects through an aperture 178 in the base of the cup-shaped component 173. The stem 177 has an enlarged end.

The valve body 160 defines a single liquid pressure inlet port 179 for connection to the liquid pressure master cylinder 13. The inlet port 179 communicates with the medial diameter bore portion 163.

A passage 180 in the body 160 interconnects the medial diameter bore portions 163 of the two valve devices 158 and 159. Ports 181 are defined in the larger diameter cylindrical side wall portion of the cup-shaped component 173. The annular chamber that is defined within the bore of the tubular component around the pin 172 is connected to the annular space 166 by a radial passage 182 in the tubular component. The housing 160 defines two outlet ports 186, one for each of the valve devices 158 and 159. Each outlet port 186 communicates with the respective annular space 166 and is for connection to the respective motor cylinder or cylinders which operate to apply brakes to the respective front wheel 11 of the motorcar. The two valve devices 158 and 159 are arranged so that the axes of the two valve plungers 171 are substantially parallel.

The control mechanism for controlling operation of the two valve devices 158 and 159 in accordance with the loading on the respective front wheels 11 comprises an interlinked pair of torsion bars 183 and 184. Each torsion bar 183, 184 comprises a central portion 183A, 184A, an inner end arm 183B, 184B and an outer end arm 183C, 184C. The axis of each end arm 183B, 183C, 184B, 184C is substantially normal to the axis of the respective centre portion 183A, 184A and the end arms 183B and 183C, 184B and 184C of each torsion bar 183, 184 extend in opposite directions. The outer end of each outer end arm 183C, 184C is coupled to a suspension component by which the body of the motorcar is supported upon a respective one of the two front wheels 11 so that that outer end of that outer end arm 183C, 184C rises and falls with up and down movement of the respective front wheel 11 relative to the body of the motor car.

A U-shaped sheet metal bracket 185 has its limbs fixed to opposite sides of the valve body 160. The bracket 185 projects from the valve body 160 midway between the two valve plungers 171 and in the same direction as the plungers 171, the base of the bracket 185 being spaced from the body 160. A cylindrical abutment 187 has its end spigotted into corresponding circular apertures in the limbs of the bracket 185 so that it is supported by the bracket 185 nearer to the base of the bracket 185 than to the body 160. An axially-spaced pair of arcuate cross-section circumferential grooves 188 are formed in the cylindrical abutment 187 each adjacent a respective one of the limbs of the bracket 185.

The inner end arm 183B, 184B of each torsion bar 183, 184 passes through the arch defined by the bracket 185 and between the valve body 160 and the cylindrical abutment 187 and is engaged, substantially at its centre, within a respective one of the arcuate section circumferential grooves 188 formed in the cylindrical abutment 187. The central portion 183A, 184A of each torsion bar 183, 184 passes between the outermost end of the inner end arm 183B, 184B of the other torsion bar 183, 184 and the valve body 160. Each central torsion bar portion 183A, 184A also passes across the outer end of the valve plunger 171 of the valve device 158, 159 that has its outlet port 186 connected to motor cylinders which operate to apply brakes to the front wheel 11 that has one of its suspension components coupled to the outer end of the outer end arm 183C, 184C of the same torsion bar 183, 184.

Each valve plunger 171 is held in abutment with the respective central torsion bar portion 183A, 184A by the respective coil springs 174 and 176. The torsion bars 183 and 184 are assembled so that they are twisted by equal amounts and in opposite directions from their natural states, the interlinked portions of the two torsion bars 183 and 184 interacting with one another so that the torsional preloads are balanced. Under normal conditions, when the body of the motor car is substantially horizontal, each valve plunger 171 is held by the respective torsion bar 183, 184 in the position shown in FIG. 13 in which its pin 172 holds the respective disc valve member 175 spaced from the co-operating valve seat that is defined by the respective seal 170. When the master cylinder 13 is operated to apply the brakes in such circumstances the liquid pressure is transmitted through the inlet port 179 to the medial diameter bore portion 163 of the valve device 158 and from that bore portion 163 to the medial diameter bore portion 163 of the valve device 159 via the passage 180. The liquid pressure is transmitted from each medial diameter bore portion 163 to the respective motor cylinder or cylinders that operate to apply brakes to the respective front wheel 11, via the ports 181 in the respective cup-shaped component 173, the central aperture defined by the respective annular flange 168 and annulus 169, the respective annular flange 168 and annulus 169, the respective radial passage 182, annular space 166 and outlet port 186. The interlinked torsion bars 183 and 184 withstand the fluid pressure loading on the valve plungers 171 as well as the loading of the coil springs 174 and 176 when the master cylinder 13 is operated to apply the brakes under normal conditions when the motor car body is substantially horizontal.

When both front wheels 11 of the motor car are driven over the same bump so that the loading on the two front wheels 11 is increased equally, the outer end arm 183C of the torsion bar 183 is moved angularly in an anti-clockwise direction as seen from the left of FIG. 16, and the outer end arm 184C of the torsion bar 184 is moved angularly in a clockwise direction as seen from the left of FIG. 16. The torsion bars 183 and 184 react against one another so that they are twisted by equal amounts in opposite directions. The interaction between the outer end arms 183B, 184B of each torsion bar 183, 184 and the central torsion bar portion 183A, 184A of the other torsion bar 183, 184 leads to there being no out of balance forces applied by the torsion bars 183 and 184 to the valve plungers 171 when the torsion bars 183 and 184 are so twisted by equal amounts in opposite directions so that the biassing loads which act to hold the disc valve member 175 of the two valve devices 158 and 159 unseated are not reduced and the condition of the valve devices 158 and 159 is unchanged.

When the motor car body rolls about its longitudinal axis, for example when the car is driven around a bend or corner so that the load carried by the outboard of the type front wheels is increased and the load carried by the inboard of the two front wheels is reduced, the two outer end arms 183C and 184C are rotated in the same sense about the axis of the respective central torsion bar portion 183A, 184A. For the convenience of this description it has been assumed that the outboard front wheel 11 is the wheel 11 that has its brake applied by the motor cylinder or cylinders to which the supply of liquid pressure is controlled by the valve device 158. In such circumstances the two outer end arms 183C and 184C are rotated in an anti-clockwise direction, as seen from the left in FIG. 14, so that the torsional loading of the torsion bar 184 is increased and the torsional loading of the torsion bar 183 is reduced. The interlinked portions of the torsion bars 183 and 184 function as a beam which is pivotted about the cylindrical abutment 187 by the out of balance torque which acts therein. Thus the load which urges the valve plunger 171 of the valve device 159 towards the closed end wall is reduced.

If the brakes are not applied when the car is driven into a bend or corner, the disc valve member 175 of the valve device 159 is seated upon the co-operating valve seat 170 by the coil springs 174 and 176 and the valve disc 175 of the valve device 158 remains unseated. If the master cylinder 13 is operated to apply the brakes whilst the motor car is being driven around such a bend or corner, liquid pressure will be transmitted only through the valve device 158 to the motor cylinder or cylinders which operate brakes on the outboard front wheel 11, the other valve device 159 remaining closed. The liquid pressure loading on the valve plunger 171 of the valve device 158, which acts in opposition to the torsion bar 183, increases as the liquid pressure in the associated motor cylinder or cylinders builds up. Eventually the out of balance force that is exerted upon the valve plunger 171 of the valve device 158 by the interlinked torsion bars 183 and 184 is counteracted by the liquid pressure loading on that valve plunger 171 sufficiently for the interlinked torsion bars 183 and 184 to be deflected back to the condition in which the disc valve member 175 of the other valve device 159 is unseated by the action of the torsion bar 184 that is transmitted through the respective valve plunger 171. Liquid pressure can then be transmitted through the valve device 159 to the motor cylinder or cylinders which operate to apply brakes to the inboard front wheel 11. However the disc valve member 175 of the valve device 159 will soon be reseated, because the liquid pressure loading on the respective valve plunger 171 counteracts the action of the torsion bar 184, unless the master cylinder pressure is increased further. Further increases in master cylinder pressure will be accompanied by a progressive increase in the liquid pressure transmitted through both valve devices 158 and 159 to the respective motor cylinders. The pressure differential between the liquid pressure in the motor cylinder or cylinders that are connected to the outlet port 186 of the valve device 158 and the liquid pressure in the motor cylinder or cylinders that are connected to the outlet port 186 of the valve device 159 is maintained. Such a pressure differential must be maintained if the out of balance torque exerted by interlinked torsion bars 183 and 184 is to be overcome to allow the disc valve member 175 of the valve device 159 to be unseated for the transmission of liquid pressure through that valve device 159. Thus that pressure differential is related to the out of balance torque that is exerted by the interlinked torsion bars 183 and 184.

If the brakes are applied before the motor car is driven into a bend or corner, of if the motor car is accelerated whilst it is being driven around such a bend or corner and the liquid pressure has been transmitted through both valve devices 158 and 159 and built up in the associated motor cylinders so that the brakes are applied to both front wheels 11, albeit so that the applied brake pressure acting on the outboard front wheel is higher than that which acts on the inboard front wheel, the interlinked torsion bars 183 and 184 will either exert a load on the valve plunger 171 of the valve device 158, 159 which controls the supply of liquid pressure to the motor cylinder or cylinders which operate to apply brakes to the outboard front wheel, or will increase such a load. Either way the biassing load which acts upon the valve plunger 171 of the other valve device 158, 159 will be reduced. Thus, the disc vavlve member 175 of that other valve device 158, 159 will seat, closing off the supply of further liquid pressure to the associated motor cylinder or cylinders which, it will be appreciated, operate to apply the brakes to the inboard front wheel 11. The valve plunger 171 of that other valve device 158, 159 will be moved away from closed end wall of the stepped bore of that other valve device 158, 159 by the action of the liquid pressure loading on that valve plunger 171, thereby increasing the volume of the annular chamber that is defined within the bore of the tubular component of that other valve device 158, 159 around the axially-extending pin 172 of the valve plunger 171 and thereby reducing the liquid pressure which acts within the associated motor cylinder or cylinders to apply brakes to the inboard front wheel 11.

The cup-shaped component 173 of each valve device 158, 159 acts as a spring loaded stop which opposes undue movement of the respective valve plunger 171 is response to the movement of the respective front wheel 11 over a normal road bump.

Referring now to FIGS. 16 and 17, the supply of liquid pressure to the motor cylinder or cylinders which operate to apply brakes to each rear wheel 12 of the motor car is controlled by a respective one of two valve devices 189 and 190 which are housed in a common valve body 160 which is similar to the valve body 160 which houses the valve devices 158 and 159. The detailed construction of the valve devices 189 and 190 is similar to that which has been described above with reference to FIGS. 13 to 15 for the valve devices 158 and 159. For convenience similar parts of the valve devices 158 and 159 and 189 and 190 are identified by the same reference numerals. The following description will be directed only to the important features of difference between the valve devices 189 and 190 and their associated control linkage on the one hand and the valve devices 158 and 159 and their associated control linkage on the other hand.

The only feature of difference between the valve devices concerns the cup-shaped sheet metal component 173. The coil spring 174 is omitted from the valve devices 189 and 190. The diameter of the smallest diameter bore portion 162 of the valve devices 189 and 190 is less than the diameter of the corresponding bore portion 162 of the valve devices 158 and 159. The smaller diameter portion of the cup-shaped component 173 is spigotted into the smallest diameter bore portion 162 in the valve devices 189 and 190 and the shoulder that is defined by the stepped cylindrical wall of that cup-shaped component 173 is located positively against the shoulder that is defined between the smallest and medial diameter bore portions 162 and 163 in each of those valve devices 189 and 190. The torsion bars 191 and 192 of the assembly shown in FIGS. 16 and 17, although being similar to the torsion bars 183 and 184 of the assembly shown in FIGS. 13 to 15 and being associated similarly with the respective valve plungers 171 and the cylindrical abutment 187, are not interlinked, the inner end arm of each torsion bar 191, 192 geing shorter than the inner end arms 183B, 184B and terminating between the cylindrical abutment 187 and the central torsion bar portion of the other torsion bar 191, 192. Thus the biassing load which acts upon the valve plunger of each of the valve devices 189 and 190 is exerted by the respective torsion bar 191, 192 independently of the other torsion bar 192, 192 in a manner similar to that which has been described above with reference to FIG. 1. As stated above, each valve device 189, 190 is arranged so that its valve disc 175 seats to close communication between the inlet and the outlet of the valve device 189, 191 when the respective biassing load is overcome, that communication being reopened only when the master cylinder pressure is relieved or when the respective biassing load is increased.

The various embodiments of the invention which have been described so far with reference to FIGS. 1 to 17 of the accompanying drawings each include a control mechanism which is operable to sense movement of the vehicle body relative to each of the front wheels 11. That control mechanism computes signals which are indicative of relative movement between the vehicle body and the front wheels 11 and operates to reduce the biassing load that acts to oppose closure of the valve device that controls liquid pressure fed to the motor cylinder or cylinders that operate to apply brakes to the more lightly laden front wheel 11 of the vehicle when the relative movement between the vehicle body and one of the front wheels 11 is not the same as the relative movement between the vehicle body and the other front wheel 11. The arrangement is such that, when the relative movement between the vehicle body and each front wheel is the same there is no reduction in the biassing load which acts to oppose closure of either of the two valve devices that control liquid pressure fed to the motor cylinders that operate to apply brakes to the two front wheels 11, the two biassing loads being maintained substantially equal one to the other.

There will now be described, with reference to FIG. 1B, a valve device for controlling the supply of liquid pressure to the motor cylinder or cylinders which operate to apply brakes to a front wheel 11 of the vehicle, the valve device being controlled by a control mechanism, like the control mechanism described above with reference to FIG. 1 for controlling the valve devices 16 and 17, which is independent of the control mechanism that controls a similar valve device which controls the supply of liquid pressure to the motor cylinder or cylinders which operate to apply brakes to the other front wheel 11 of the vehicle.

Figure 18:
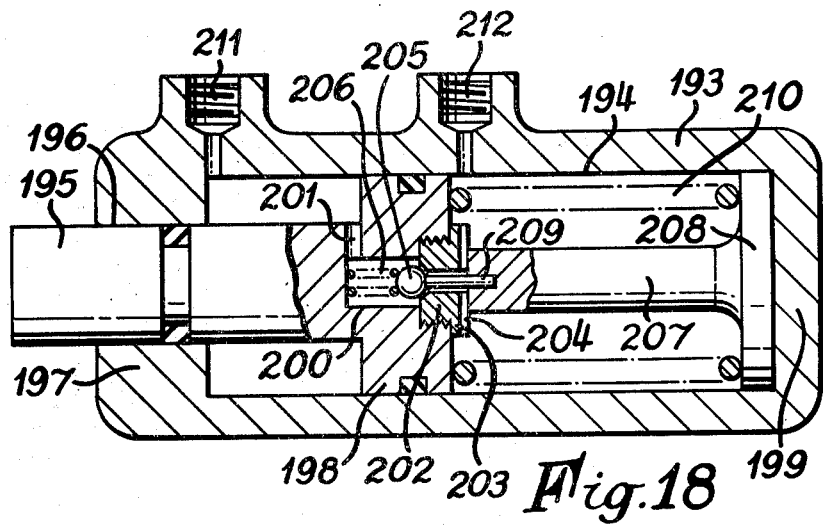
FIG. 18 is a view similar to FIG. 9 of another form of valve device for controlling the liquid pressure which acts to apply a brake to a front wheel of a vehicle in another form of liquid pressure braking system according to this invention.

Referring now to FIG. 18, the valve body 193 of the valve device, which is mounted on the vehicle body, defines a cylinder chamber 194. A valve plunger 195 slides within an aperture 196 in an end wall 197 of the cylinder chamber 194 and carries a piston head 198 at one end, the piston head 198 being a sliding fit within the cylinder chamber 194. The valve plunger 195 is connected outside the valve body 193 to a control mechanism (not shown). The control mechanism exerts a biassing load upon the valve plunger 195 which urges the valve plunger 195 towards the other end wall 199 of the cylinder chamber 194, the biassing load being exerted by a spring or equivalent resilient means which is coupled to the wheel bearing support of the respective front wheel 11 so that the biassing load is related to the load supported by that front wheel 11.

A blind bore 200 extends axially through the piston head 198 from the face of the piston head 198 that is nearer the end wall 199. A radial passage 201 in the valve plunger 195 places the blind bore 200 in communication with the annular cylinder space that is defined between the piston head 198 and the end wall 197. The mouth of the blind bore 200 is rebated and tapped. An annular valve seat 202 is screwed into the mouth of the blind bore 200. The valve seat 202 has a radial flange 203 at its end which is nearer the end wall 199, the flange 203 being in abutment with the piston head 198. Radial grooves 204 are formed in the face of the radial flange 203 that is nearer to the end wall 199. A ball 205 is within the blind bore 200 between the annular valve seat and the closed end wall of the blind bore 200. A coil spring 206 reacts against the closed end wall of the blind bore 200 and urges the ball 205 towards the annular valve seat 202. The diameter of the ball 205 is greater than that of the central aperture of the annular valve seat 202 so that the passage through the piston head 198 that is afforded by the radial passage 201, the blind bore 200 and the central aperture of the annular valve seat 202 is closed when the ball 205 seats upon the perimeter of the adjacent end of the central aperture of the annular valve seat 202.

A pillar 207 projects axially from a circular disc 208 which is a sliding fit within the cylinder chamber 194 and which abuts the end wall 199. A pin 209 is embedded in the end of the pillar 207 and projects axially therefrom towards the end wall 197. A coil spring 210 reacts against the circular disc 208 and urges the piston head 198 towards the end wall 197 in opposition to the biassing load that is applied to the valve plunger 195 by the external control mechanism.

The valve-device has an inlet port 211 for connection to the master cylinder 13 and an outlet port 212 for connection to the respective motor cylinders that operate to apply brakes to the respective front wheel 11. The inlet port 211 communicates with the annular cylinder space defined between the end wall 197 and the piston head 198 and the outlet port 212 communicates with the cylinder space between the piston head 198 and the end wall 199.

The coil spring 210 is selected so that the force it exerts is substantially less than the minimum biassing load that is applied to the valve plunger 195 by the control mechanism when the vehicle is being driven under normal road conditions in a straight line with the vehicle body substantially horizontal. Thus the biassing load holds the valve plunger 195 with the valve seat 202 in abutment with the pillar 207, the ball 205 being unseated by the pin 209. When brakes are applied under these conditions, liquid pressure is transmitted from the inlet port 211 to the outlet port 212 via the radial passage 201, the blind bore 200, the central aperture of the annular valve seat 202 and the radial grooves 204. The biassing load increases with increase in applied braking pressure because of load transfer from the rear wheels to the front wheels under braking, and the combined effects of the liquid pressure loading on the valve plunger 195 and the coil spring 210 are insufficient to overcome the biassing load so that liquid pressure is transmitted unchecked through the valve device as long as the vehicle continues in a straight line.

When the vehicle body rolls about its longitudinal axis so that the loading on the front wheel 11 which is associated with the valve device shown in FIG. 18 is reduced, for example when the vehicle is driven around a bend or corner and that front wheel 11 is the inboard front wheel, the magnitude of the biassing load applied to the valve plunger 195 by the control mechanism is reduced. If the master cylinder 13 is operated to apply the brakes before the vehicle is driven into such a bend or corner, the combined effects of the coil spring 210 and the differential liquid pressure loading on the valve plunger 195 can overcome the reduced biassing load when the vehicle is being driven round the bend or corner so that the valve plunger 195 is moved to separate the annular valve seat 202 from the pillar 207 and the ball 205 is seated to close the central aperture of the annular valve seat 202. The piston head 198, with the ball 205 seated therein, continues to be carried away from the end wall 199 by the valve plunger 195 so that the volume of the cylinder space between piston head 198 and the end wall 199 is increased with a consequent reduction in the pressure of liquid therein and thus a reduction in the liquid pressure that acts in the respective motor cylinder or cylinders to apply brakes to the respective wheel. The movement of the piston head 198 away from the end wall 199 continues until the biassing load is counterbalanced by the effects of the coil spring 210 and the differential liquid pressure loading on the valve plunger 195. If the master cylinder 13 is operated to apply the brakes whilst the vehicle is being driven around a bend or corner, the valve device will function as a pressure reducing valve as will be apparent from the foregoing description with reference to FIGS. 3, 9 and 10.

Some degree of anti-skid control is provided by utilisation of the valve device shown in FIG. 18. This is because the increase in the biassing load which occurs when the brakes are applied will be at a lower rate if a skid occurs owing to the reduced overall braking force on the vehicle. Such a reduction in the increase of the biassing load will enable the combined effects of the coil spring 210 and the differential liquid pressure loading on the piston head 198 to move the valve plunger 195 against the action of that biassing load so that the ball 205 can seat if that brake pressure is excessive during such skid conditions, the valve functioning as a pressure reducing valve in the manner that has been described above, once the ball 205 has seated and for as long as the skid condition prevails.

Provision of the internal spring 210 enables the liquid pressure that is transmitted through the valve device that is shown in FIG. 18 to be reduced to a pressure which is lower than would normally be the minimum if the biassing load was zero.

A valve device which is similar in construction and operation to that described above with reference to FIG. 18, may be used as either one of the valve devices 16 and 17 in the liquid pressure braking system that has been described with reference to FIG. 1. The internal spring 210 may be omitted if the linkage is coupled to the plunger 195 such that under conditions of greatly reduced loading of the respective wheel 11 or 12 the normal biassing load on the valve plunger 195 is reversed. Thus any valve device which functions as a pressure reducing valve as described above may be used if its plunger is so coupled to the linkage.

The various control mechanisms described above are not limited to use in combination with the specific design of valve device with which they are associated operatively in the foregoing description. Furthermore a braking system can incorporate different designs of valve devices to control liquid pressure which acts to apply brakes to different wheels of the vehicle.

A valve device of the kind described above with reference to FIGS. 13 to 17 can be used in a manner similar to that which has been described above with reference to FIG. 18, it not being necessary to provide such a valve device with an internal spring which opposes the applied biassing load.

A control mechanism, such as any one of those which has been described above with reference to FIGS. 1 to 15 for controlling the valve devices which control liquid pressure that acts to apply brakes to the front wheels of the vehicle, may be employed to sense the loading on the rear wheels of a vehicle and to control valve devices which control liquid pressure that acts to apply brakes to the front wheels of the vehicle. Furthermore, a similar control mechanism, which senses the loading on either the front wheels or the rear wheels of a vehicle, may control a pair of valve devices which are arranged so that one controls the liquid pressure that acts to apply brakes to the wheels of the vehicle on one side of the vehicle, and so that the other controls the liquid pressure that acts to apply brakes to the wheels of the vehicle on the other side of the vehicle, if the vehicle is of the kind in which load transfer to the front wheels under braking is small.

A rigid link may be used instead of the cable 156.

The various torsion bars described above may be replaced by mechanisms which function in a similar manner to transmit to each valve device a signal which is indicative of the loading on a respective wheel of the vehicle.

I claim:

1. A fluid pressure braking system for a vehicle including a driver-controlled source of liquid pressure, a first liquid pressure control device for controlling the pressure that is exerted to apply a brake to a first front wheel of the vehicle which is on one side of the vehicle, a second liquid pressure control device for controlling the pressure that is exerted to apply a brake to a second front wheel of the vehicle which is on the other side of the vehicle, each liquid pressure control device comprising a valve member and a valve seat with which said valve member co-operates, and control means for each liquid pressure control device, the control means being operable to exert a biassing load which acts to separate each valve member and the respective valve seat so as to allow the transmission of liquid pressure from said source through the space between the valve member and the valve seat of each liquid pressure control device, the valve member and the associated valve seat of each liquid pressure control device being so arranged that the action of the biassing load exerted by the respective control means is opposed by the action of liquid pressure which is exerted to apply the brake to the respective wheel so that the respective valve member seats upon its associated valve seat when that liquid pressure reaches a level which is dependent upon the respective applied biassing load, the control means being operable to change either biassing load in response to conditions which indicate that the load supported by the respective wheel is reduced so that any pressure which is exerted to apply the brake to the other of said first and second wheels is higher than any pressure which is exerted to apply the brake to the said respective wheel, wherein the biassing load which acts to separate each valve member and the respective valve seat is sufficient to hold the valve member and the valve seat of each of said liquid pressure control devices separated if the control means sense conditions which indicate that the two front wheels support substantially identical loads so that the pressure exerted to apply the brakes to both said front wheels is not varied from the pressure that is transmitted by the driver-controlled source of liquid pressure.

2. A fluid pressure braking system according to claim 1, wherein the control means for the two liquid pressure control devices are responsive to relative movement between the vehicle body and each of two reference whels which are on opposite sides of the vehicle and are operable to exert a force which causes the said change in the biassing load of the appropriate liquid pressure control device when the relative movement between the vehicle body and one of the reference wheels differs from the relative movement between the vehicle body and the other reference wheel, the arrangement being such that no such force is exerted when the relative movement between the vehicle body and the two reference wheels is the same.

3. A fluid pressure braking system according to claim 2, wherein the two reference wheels are said first and said second front wheels.

4. A fluid pressure braking system for a vehicle according to claim 2, wherein each liquid pressure control device is a pressure reducing valve which is arranged so that an increase in the liquid pressure that is transmitted by the driver controlled liquid pressure source after the valve member has seated causes that valve member to be unseated to permit a further increase in the liquid pressure that is transmitted from said source through the space between that valve member and the associated valve seat, the valve member being reseated by the increased liquid pressure downstream thereof before that downstream liquid pressure reaches the pressue that is transmitted by the driver controlled source of liquid pressure so that the pressure that acts to apply the brake to the respective wheel increases at a lower rate than does the pressure that is transmitted by the driver-controlled source of liquid pressure after the valve member has seated initially, and including resilient means which exert the respective biassing load that acts to separate the valve member and the valve seat.

5. A fluid pressure braking system according to claim 2, wherein said first liquid pressure control device also controls the pressure that acts to apply a brake to one rear wheel of the vehicle which is on the same side of the vehicle is as said first front wheel and said second liquid pressure control device also controls the pressure that acts to apply a brake to another rear wheel of the vehicle which is on the same side of the vehicle as is said second front wheel.

6. A fluid pressure braking system according to claim 2, including two further fluid liquid pressure control devices which control the pressure that is exerted to apply brakes to rear wheels of the vehicle, each of the further liquid pressure control devices comprising a valve member and a valve seat with which that valve member co-operates, and a control mechanism for each of the two further liquid pressure control devices which is independent from the control mechanism for the other of said two further liquid pressure control devices, each control mechanism for said two further liquid pressure control devices being operable to exert a biassing load which is related to the load supported by the respective rear wheel and which acts to separate the valve member and the valve seat of the respective one of said two further liquid pressure control devices, the valve member and the associated valve seat of each further liquid pressure control device being so arranged that the action of the biassing load exerted thereon by the respective control mechanism is opposed by the action of the liquid pressure which is exerted to apply the brake to the respective rear wheel so that the respective valve member seats upon its associated valve seat when that liquid pressure reaches a level which is dependent upon the applied biassing load that is exerted to separate the valve member and the valve seat of the respective further liquid pressure control device.

7. A fluid pressure braking system according to claim 2, wherein the control means includes a member which has a first part which is coupled to a first suspension component by which the vehicle body is supported on one of the two reference wheels so that that first part is subjected to a first force which is a function of the load borne by the first reference wheel, a second part which is coupled to a second suspension component by which the vehicle body is supported upon the other of the two reference wheels so that that second part is subjected to a second force which is a function of the load borne by the second reference wheel, and a third part which is midway between the first and second parts and which is coupled to a respective one of the valve member and valve seat of the two liquid pressure control devices, the arrangement being such that the third part is urged in reaction to the first and second forces to exert said force when relative movement of the vehicle body relative to one of the reference wheels differs from relative movement between the vehicle body and the other of said reference wheels whilst being unloaded in reaction to the first and second forces when the relative movement between the vehicle body and the two reference wheels is the same.

8. A fluid pressure braking system according to claim 2, wherein the control means includes a member which is coupled to a first suspension component by which the vehicle body is supported on one of the two reference wheels and to a second suspension component by which the vehicle body is supported on the other of the two reference wheels so that it is subjected to a first force which is a function of the load borne by the first reference wheel and to a second force which is a function of the load borne by the second reference wheel, the member being arranged so that the first and second forces are balanced when the relative movement between the vehicle body and the two reference wheels is the same and so that it exerts a force which is a resultant of the first and second forces when relative movement between the vehicle body and one of the reference wheels differs from the relative movement between the vehicle body and the other of said reference wheels, the force so exerted by the member seing the force that causes the said change in the biassing load of the appropriate liquid pressure control device.

9. A fluid pressure braking system according to claim 1, wherein the first liquid pressure control device controls the pressure that acts in a first liquid pressure motor cylinder to apply the brake to the first front wheel; and the second liquid pressure control device controls the pressure that acts in a second liquid pressure motor cylinder to apply the brake to the second front wheel; each of the liquid pressure control devices comprising a chamber which is in communication with the respective liquid pressure motor cylinder, the chamber having a movable wall which comprises a face of a plunger which is engaged slidably within a bore, the plunger having a valve unseating probe which projects from said face into the chamber and which is adapted to unseat the respective valve member so that the driver-controlled source of liquid pressure communicates with the chamber, and biassing means for exerting a biassing force on the plunger which urges that plunger in the direction to unseat the respective valve member which is allowed to seat by movement of the plunger in the opposite direction; the control means of each liquid pressure control device being adapted to vary the effect of the biassing force on the plunger of that liquid pressure control device in order to change the respective biassing load so that the volume of the respective chamber can be varied by movement of that plunger with a consequent variation in the liquid pressure that acts in that chamber and in the associated liquid pressure motor cylinder when that chamber is isolated from the driver-controlled source of liquid pressure.

10. A fluid pressure braking system for a vehicle including a driver controlled source of fluid pressure; a first fluid pressure control device for controlling the pressure that is exerted to apply a brake to a first front wheel of the vehicle which is on one side of the vehicle; a second fluid pressure control device for controlling the pressure that is exerted to apply a brake to a second front wheel of the vehicle which is on the other side of the vehicle, each fluid pressure control device comprising a valve member and a valve seat with which said valve member co-operates; and a control mechanism for each fluid pressure control device, the control mechanism being operable to exert a biassing load which acts to separate each valve member and the respective valve seat so as to allow the transmission of fluid pressure from said source through the space between the valve member and the valve seat of each fluid pressure control device, the valve member and the associated valve seat of each fluid pressure control device being so arranged that the action of the biassing load exerted by the respective control mechanism is opposed by the action of fluid pressure which is exerted to apply the brake to the respective wheel so that the respective valve member seats upon its associated valve seat when that fluid pressure reaches a level which is dependent upon the respective applied biassing load, the control mechanism being operable to change either biassing load in response to conditions which indicate that the load supported by the respective wheel is reduced so that any pressure which is exerted to apply the brake to the other of said first and second wheels is higher than any pressure which is exerted to apply the brake to the said respective wheel; each fluid pressure control device being a pressure reducing valve which is arranged so that an increase in the fluid pressure that is transmitted by the drive controlled fluid pressure source after the valve member has seated causes that valve member to be unseated to permit a further increase in the fluid pressure that is transmitted from said source through the space between that valve member and the associated valve seat, the valve member being reseated by the increased fluid pressure downstream thereof before that downstream fluid pressure reaches the pressure that is transmitted by the driver controlled source of fluid pressure so that the pressure that acts to apply the brake to the respective wheel increases at a lower rate than does the pressure that is transmitted by the driver controlled source of fluid pressure after the valve member has seated initially; and the control mechanism for each pressure reducing valve includes resilient means which act to separate the valve member and the valve seat and loading means which are responsive to said conditions and which are operable to oppose the action of said resilient means when said conditions indicate that the load supported by the respective wheel is reduced, wherein the biassing load that acts to separate each valve member and the respective valve seat which comprises the difference between the load exerted by the respective resilient means and loading means, is sufficient to hold the valve member and the valve seat of each of said fluid pressure control device separated if the control mechanism senses conditions which indicate that the two front wheels support substantially identical loads so that the pressure exerted to apply the brakes to said front wheels is not varied from the pressure that is transmitted by the driver controlled source of fluid pressure.

11. A fluid pressure braking system for a vehicle including a driver controlled source of liquid pressure, a first liquid pressure control device for controlling the pressure that acts in a first liquid pressure motor cylinder to apply a brake to a first front wheel which is on one side of the vehicle, a second liquid pressure control device for controlling the pressure that acts in a second liquid pressure motor cylinder to apply a brake to a second front wheel which is on the other side of the vehicle, each liquid pressure control device having one operational state in which it permits unrestricted transmission of liquid pressure from said driver controlled source to the respective motor cylinder and being arranged so that any liquid pressure which acts in the respective motor cylinder to apply a brake to the respective front wheel tends to vary the pressure control characteristics of that liquid pressure control device so that, when the operational state of that liquid pressure control device is changed from said one state by the action of liquid pressure which acts in the respective motor cylinder, the liquid pressure that acts in that motor cylinder differs from that which is transmitted by the driver controlled source, there being biassing means associated with each liquid pressure control device, each biassing means being operable to exert a biassing load which tends to maintain the said one operational state of the respective liquid pressure control device in opposition to the tendency for any liquid pressure which acts in the respective motor cylinder to change that state, and a control mechanism which is responsive to conditions which are indicative of load transfer from one of said front wheels to the other and which is operable to vary any biassing load exerted by the biassing means which are associated with one of said liquid pressure control devices in response to such conditions so that any pressure which acts in the liquid pressure motor cylinder that is controlled by the other liquid pressure control device is higher than any pressure which acts in the liquid pressure motor cylinder that is controlled by said one liquid pressure control device, each biassing means being operable to exert a biassing load which is sufficient to maintain the said one operational state of the respective liquid pressure control device, if the pressure of liquid transmitted by operation of the drive controlled source of liquid pressure is below a predetermined maximum liquid pressure which is commensurate with the initiate of wheel locking, and being allowed to exert such a biassing load when the control mechanism senses conditions which indicate that the two front wheels support substantially identical loads.

12. A fluid pressure braking system according to claim 11, wherein the biassing means comprise a coil spring.

13. A fluid pressure braking system according to claim 12, wherein the control means comprise a mechanism which includes a link, one end of the link being linked pivotally to one end of an arm which projects radially from one torsion bar which has its other end linked pivotally to wheel bearing support means for one of said reference wheels and the other end of the link being linked pivotally to one end of an arm which projects radially from another torsion bar which has its other end linked pivotally to wheel bearing support means for the other of the said two reference wheels, the arrangement being such that the link is rotated freely about an axis by said torsion bars when relative movement between the vehicle body and one of said reference wheels is substantially equal to relative movement between the vehicle body and the other of said reference wheels, and such that the link is urged laterally to exert said force by the forces that are applied to it by said torsion bars when relative movement of the vehicle body relative to one of the reference wheels differs from the relative movement between the vehicle body and the other of said reference wheels.

14. A fluid pressure braking system according to claim 13, wherein the control mechanism includes a resiliently compressible member which is mounted pivotally within an aperture which extends through the link and which interconnects the valve member of the two fluid pressure control devices, the two valve members being urged apart by the resilience of the resiliently compressible member, the arrangement being such that the said force which acts to change the biassing load is applied to the valve member of the appropriate liquid pressure control device via the resiliently compressible member.

15. A fluid pressure braking system according to claim 13, wherein the link is journaled within an elongate component for free rotary movement about said axis, the elongate component being coupled at either end by a lost motion connection to a respective valve plunger of the two liquid pressure control devices, the arrangement being such that the elongate component and one of the two valve plungers tend to move together relative to the other valve plunger when the link is urged laterally in one direction so that the said force is transmitted by the component to the said one valve plunger, and the other valve plunger tends to move relative to said one valve plunger with lateral movement of the link in the opposite direction so that the said force is applied to the said other valve plunger.

16. A fluid pressure braking system according to claim 13, wherein the control means include a mechanism which comprises a pair of torsion bars which each act to exert said force upon a respective valve plunger which defines one of the valve members and the valve seat of a respective one of the two liquid pressure control devices, one of the torsion bars being linked pivotally to wheel bearing support means for one of said reference wheels, the other torsion bar being linked pivotally to wheel bearing support means for the other reference wheel, and the two torsion bars being interconnected so that the torsional loads induced therein are balanced substantially when relative movement between the vehicle body and one of the reference wheels equals relative movement between the vehicle body and the other reference wheel, and so that the torsional loads induced thherein are out of balance when relative movement between the vehicle body and one of the reference wheels is unequal to relative movement between the vehicle body and the other reference wheel, the out of balance torque being reacted within the appropriate fluid pressure control device in order to effect the appropriate change in the biassing load which acts upon the valve member of that device.

17. A fluid pressure braking system according to claim 16, wherein a part of each of the torsion bars is mounted pivotally upon the vehicle body and the two torsion bars are interconnected by a tension member which maintains its location relative to the vehicle body when relative movement between the vehicle body and each of the reference wheels is substantially the same and which tends to move along its length relative to the vehicle body when relative movement between the vehicle body and one of the reference wheels differs from the relative movement between the vehicle body and the other reference wheel, so that the saie torsion bar parts tend to pivot about their pivot mountings relative to the liquid pressure control devices, each torsion bar part being coupled with the valve plunger of a respective one of the liquid pressure control devices by a lost motion connection so that the valve plunger of the appropriate liquid pressure control device is engaged by the respective torsion bar which transmits the out of balance force thereto and thereby changes the biassing load exerted thereon.

18. A fluid pressure braking system according to claim 16, wherein the two torsion bars are interlinked one with the other so that they interact directly with one another to either balance the torsional loads therein or to develop the out of balance torque, the interlinked portions of the two torsion bars co-operating together to function as a beam which pivots about a fixed abutment when an out of balance torque is induced therein so that the force applied by one of the torsion bars to the respective valve plunger is increased and the force applied by the other torsion bar to the other valve plunger is reduced.

19. A fluid pressure braking system according to claim 18, wherein each liquid pressure control device is arranged so that, once the liquid pressure which acts to apply a brake to the respective wheel reaches the pressure at which the liquid pressure loading on the valve member overcomes the biassing load, the valve member seats and remains seated until one of the following conditions applies, namely the liquid pressure transmitted by the driver-controlled source of liquid pressure is relieved and the biassing load is increased.

20. A fluid pressure braking system for a vehicle including a driver-controlled source of liquid pressure, a first liquid pressure control device for controlling the pressure that acts in a first liquid pressure motor cylinder to apply the brake to a first wheel which is one one side of the vehicle; a second liquid pressure control device for controlling the pressure that acts in a second liquid pressure motor cylinder to apply a brake to a second wheel which is on the other side of the vehicle; each of liquid pressure control devices comprising a chamber which is in communication with the liquid pressure motor cylinder, valve means which operate under certain operating conditions to isolate said chamber from the driver-controlled source of liquid pressure, the chamber having a movable wall which comprises a face of a plunger which is engaged slightly within a bore, the plunger having a valve unseating probe which projects from said face into the chamber and which is adapted to unseat a valve member of the valve means so that the driver-controlled source of liquid pressure communicates with the chamber through said valve means, and biassing means for exerting a biassing force on said plunger to urge the plunger in the direction to unseat the valve member, the valve member being allowed to seat to isolate the chamber from the driver-controlled source of liquid pressure by movement of the valve unseating probe with movement of the plunger away from said valve means; and control means which are responsive to conditions which are indicative of load transfer from one of said wheels to another and which are operable to modify the performance of one of said liquid pressure control devices in response to such conditions by permitting operation of the valve means of said one liquid pressure control device to isolate the chamber of that liquid pressure control device from the driver-controlled source of liquid pressure and to vary the effect of the biassing force on the plunger of that liquid pressure control device so that the volume of that chamber can be varied by movement of that plunger with a consequent variation in the liquid pressure that acts in that chamber and in the associated liquid pressure motor cylinder when that chamber is isolated from the driver-controlled source of liquid pressure so that any pressure which acts in the appropriate liquid pressure motor cylinder to apply the brake to the other of said wheels is higher than any pressure which acts in the other liquid pressure motor cylinder to apply the brake to said one wheel.

* * * * *